(12) United States Patent
Kanumuri et al.

(10) Patent No.: US 8,837,579 B2
(45) Date of Patent: Sep. 16, 2014

(54) METHODS FOR FAST AND MEMORY EFFICIENT IMPLEMENTATION OF TRANSFORMS

(75) Inventors: Sandeep Kanumuri, Sunnyvale, CA (US); Onur G. Guleryuz, San Francisco, CA (US); Akira Fujibayashi, Kanagawa (JP); M. Reha Civanlar, Palo Alto, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1330 days.

(21) Appl. No.: 12/239,195

(22) Filed: Sep. 26, 2008

(65) Prior Publication Data
US 2009/0195535 A1 Aug. 6, 2009

Related U.S. Application Data

(60) Provisional application No. 61/026,453, filed on Feb. 5, 2008.

(51) Int. Cl.
*H04B 1/66* (2006.01)
*H04N 19/132* (2014.01)
(Continued)

(52) U.S. Cl.
CPC ........ *G06F 17/147* (2013.01); *H04N 19/00127* (2013.01); *H04N 19/00848* (2013.01); *H04N 19/00157* (2013.01); *G06T 5/10* (2013.01); *G06T 5/004* (2013.01); *H04N 19/00909* (2013.01); *G06T 2207/10016* (2013.01); *G06T 2207/20021* (2013.01); *H04N 19/00303* (2013.01); *H04N 19/00018* (2013.01); *H04N 19/00278* (2013.01); *H04N 19/00563* (2013.01); *H04N 19/00084* (2013.01); *H04N 19/00757* (2013.01); *G06T 2207/20052* (2013.01); *H04N 19/00296* (2013.01); *G06F 17/145* (2013.01)
USPC .................................. 375/240.01; 348/403.1

(58) Field of Classification Search
CPC ................ G06F 17/145; G06F 17/147; G06T 2207/10016; G06T 2207/20021; G06T 2207/20052; G06T 5/004; G06T 5/10; H04N 19/00018; H04N 19/00084; H04N 19/00127; H04N 19/00157; H04N 19/00278; H04N 19/00296
USPC ............ 375/240.01–240.27; 348/448, 416.1, 348/413.1, 405, 412.1, 415.1, 403.1; 382/240, 43, 260, 275, 270, 236, 232
See application file for complete search history.

(56) References Cited

U.S. PATENT DOCUMENTS

| | | | |
|---|---|---|---|
| 4,442,454 A | | 4/1984 | Powell |
| 4,447,886 A | * | 5/1984 | Meeker ........................ 708/400 |

(Continued)

FOREIGN PATENT DOCUMENTS

| | | |
|---|---|---|
| CN | 1665298 A | 9/2005 |
| CN | 1997104 A | 7/2007 |

(Continued)

OTHER PUBLICATIONS

Seo, Hae Jong, et al., "Video Denoising Using Higher Order Optimal Space-Time Adaptation," IEEE: ICASSP 2008, pp. 1249-1252.

(Continued)

*Primary Examiner* — Behrooz Senfi
(74) *Attorney, Agent, or Firm* — Blakely, Sokoloff, Taylor & Zafman LLP

(57) ABSTRACT

Embodiments of the present invention include a set of processes and systems for implementing a forward weight-adaptive over-complete transform of an image/video frame, an inverse weight-adaptive over-complete transform of an image/video frame, and fast and low-memory processes for performing the forward weight-adaptive over-complete transform, processing coefficients in the transform domain and performing the inverse weight-adaptive over-complete transform simultaneously.

33 Claims, 27 Drawing Sheets

(51) Int. Cl.
| | |
|---|---|
| *H04N 19/60* | (2014.01) |
| *H04N 19/14* | (2014.01) |
| *G06T 5/10* | (2006.01) |
| *G06T 5/00* | (2006.01) |
| *H04N 19/86* | (2014.01) |
| *G06F 17/14* | (2006.01) |
| *H04N 19/182* | (2014.01) |
| *H04N 19/103* | (2014.01) |
| *H04N 19/176* | (2014.01) |
| *H04N 19/48* | (2014.01) |
| *H04N 19/122* | (2014.01) |
| *H04N 19/59* | (2014.01) |
| *H04N 19/18* | (2014.01) |
| *H04N 11/02* | (2006.01) |

(56) References Cited

U.S. PATENT DOCUMENTS

| | | | | |
|---|---|---|---|---|
| 5,859,788 | A * | 1/1999 | Hou | 708/400 |
| 7,277,489 | B1 * | 10/2007 | Andrew | 375/240.19 |
| 7,554,611 | B2 | 6/2009 | Zhou et al. | |
| 2002/0028025 | A1 | 3/2002 | Hong | |
| 2005/0163388 | A1 * | 7/2005 | Schwartz et al. | 382/232 |
| 2006/0050783 | A1 | 3/2006 | Le Dinh et al. | |
| 2007/0074251 | A1 | 3/2007 | Oguz et al. | |
| 2007/0160304 | A1 * | 7/2007 | Berkner et al. | 382/240 |
| 2007/0299897 | A1 * | 12/2007 | Reznik | 708/409 |
| 2009/0060368 | A1 * | 3/2009 | Drezner et al. | 382/261 |
| 2009/0195697 | A1 | 8/2009 | Kanumuri et al. | |

FOREIGN PATENT DOCUMENTS

| | | |
|---|---|---|
| EP | 1531424 A2 * | 5/2005 |
| WO | 2006127546 A2 | 11/2006 |
| WO | 2007089803 A2 | 8/2007 |

OTHER PUBLICATIONS

Guleryuz, Onur G., "Weighted Averging for Denoising with Overcomplete Dictionaries," pp. 1-24.

Naranjo, Valery, et al., "Flicker Reduction in Old Films," Proceedings of the International Conference on Image Processing, 2000, pp. 657-659.

Becker, A., et al., "Flicker Reduction in Intraframe Codecs," Proceedings of the Data Compression Conference, 2004, pp. 252-261.

Dabov, Kostadin, et al., "Video Denoising by Sparse 3D Transform-Domain Collaborative Filtering," Proceedings of the 15th European Signal Processing conference, 2007.

Abbas, Houssam, et al., "Suppression of Mosquito Noise by Recursive Epsilon-Filters," IEEE: ICASSP 2007, pp. 773-776.

Kuszpet, Yair, et al., "Post-Processing for Flicker Reduction in H.264/AVC," 4 pages.

Protter, Matan, et al., "Sparse and Redundant Representations and Motion-Estimation-Free Algorithm for Video Denoising," 12 pages.

US Office Action for related U.S. Appl. No. 12/233,468, Jun. 18, 2012, 24 pgs.

Gupta N. et al, "Wavelet domain-based video noise reduction using temporal discrete cosine transform and hierarchically adapted theshsolding", IET Image Processing, Mar. 6, 2007, pp. 2-12, vol. 1, No. 1.

Cho et al, "Warped Discrete Cosine Transform and its Application in Image Compression", IEEE transactions on Circuits and Systems for Video Technology, Dec. 2000, pp. 1364-1373, vol. 10, No. 8.

PCT International Search Report for related PCT Patent Application No. PCT/US2009/032888, Jul. 9, 2009, 4 pgs.

PCT Written Opinion of the Interational Searching Authority for related PCT Patent Application No. PCT/US2009/032888, Jul. 9, 2009, 7 pgs.

Foi A. et al., "Shape-adaptive DCT for denoising and image reconstruction", Proceedings of SPIE-IS&T Electronic Imaging, Image Processing: Algorithms and Systems, Neural Networks, and Machine Learning, Jan. 18, 2006, 12 pgs., vol. 6064.

Motwani M. C. et al., "Survey of Image Denoising Techniques", Proceedings of the Global Signal Processing Expo and Conference, Sep. 27, 2004, 7 pgs.

PCT International Preliminary Report on Patentability for related PCT Patent Application No. PCT/US2009/032888, Aug. 19, 2010, 7 pgs.

Chinese Office Action for related Chinese Patent Application No. 200980103952.3, Jan. 4, 2012, 13 pgs.

Kanumuri et al., "Fast super-resolution reconstructions of mobile video using warped transforms and adaptive thresholding", Aug. 28, 2007, 13 pgs.

Hong et al., "Image Compression Technology and Techniques", http://www.isd.mel.nist.gov/documents/hong/Loc 94.pdf, Apr. 30, 1988, 31 pgs.

Korean Office Action for related Korean Patent Application No. 2010-7017838, Jun. 29, 2012, 5 pgs.

Korean Office Action for related Korean Patent Application No. 2010-7017838, Nov. 16, 2011, 6 pgs.

Chinese Office Action for related Chinese Patent Application No. 200980103952.3, Jul. 9, 2012, 6 pgs.

PCT International Search Report for related PCT Patent Application No. PCT/US2009/032890, Sep. 10, 2012, 6 pgs.

PCT Written Opinion of the Interational Searching Authority for related PCT Patent Application No. PCT/US2009/032890, Sep. 10, 2012, 10 pgs.

Rusanovsky, et al., "Video Denoising Algorithm in Sliding 3D DCT Domain", Jan. 1, 2005, pp. 618-625.

Katkovnik, et al., "Mix-Distribution Modeling for Overcomplete Denoising", 9-th IFAC Workshop on Adaptation and Learning in Control and Signal Processing, Jan. 1, 2007, pp. 1-6, vol. 9, Imperial Anichkov Palace, Russia.

Yaroslavsky, et al., "Transform Domain Image Restoration Methods: Review, Comparison, and Interpretation", Proceedings of SPIE, Jan. 1, 2001, pp. 155-169, vol. 4304.

Yaroslavsky, "Local Adaptive Image Restoration and Enhancement With the Use of DFT and DCT in a Running Window", Proceedings of SPIE, Jan. 1, 1996, pp. 2-13, vol. 2825.

Mozafari, et al., "An Efficient Recursive Algorithm and an Explicit Formula for Calculating Update Vectors of Running Walsh-Hadamard Transform", IEEE 9th International Symposium on Signal Processing and its Applications, Feb. 12, 2007, pp. 1-4, vol.

Kober, "Fast Algorithms for the Computation of Sliding Discrete Sinusoidal Transforms", IEEE Transactions on Signal Processing, Jun. 1, 2004, 7 pgs., vol. 52-No. 6, IEEE Service Center, New York, New York, USA.

PCT International Preliminary Report on Patentability for related PCT Patent Application No. PCT/US2009/032890, Oct. 4, 2012, 10 pgs.

* cited by examiner

METHODS FOR FAST AND MEMORY EFFICIENT IMPLEMENTATION OF TRANSFORMS

PRIORITY

The present patent application claims priority to and incorporates by reference the Provisional Application Ser. No. 61/026,453, entitled "Flicker Reduction in Video Sequences Using Temporal Processing," filed on Feb. 5, 2008.

FIELD OF THE INVENTION

The embodiments of the present invention relate to the field of signal processing of image and video involving conversion of the pixel domain image/video into a transform domain, processing in the transform domain, and conversion of the processed transform domain image/video back to pixel domain. In particular, the present invention relates to performing a forward weight-adaptive over-complete transform on an input frame, performing signal processing on the transform coefficients, and applying an inverse weight-adaptive over-complete transform on the processed transform coefficients to produce output data (e.g., an output frame).

BACKGROUND OF THE INVENTION

There are a number of well-known applications in super-resolution, quality enhancement, denoising, flicker reduction and compression of image/video sequences that utilize transforms. A trivial implementation of these processes does not make use of computational and memory resources efficiently in a computer system. Therefore, a memory and computation efficient way to perform these processes, including transforms (e.g., over-complete transforms), is needed.

SUMMARY OF THE INVENTION

Embodiments of the present invention include a set of processes and systems for implementing a forward weight-adaptive over-complete transform of an image/video frame, an inverse weight-adaptive over-complete transform of an image/video frame, and fast and low-memory processes for performing the forward weight-adaptive over-complete transform, processing coefficients in the transform domain and performing the inverse weight-adaptive over-complete transform simultaneously.

BRIEF DESCRIPTION OF THE DRAWINGS

The present invention is illustrated by way of example and not limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

A method and apparatus for performing image processing is described. The image processing is performed in the transform domain. In one embodiment, the forward and inverse transforms are performed in an efficient manner in terms of memory and computation.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, functional, and other changes may be made without departing from the scope of the present invention. The following detailed description is, therefore, not to be taken in a limiting sense, and the scope of the present invention is defined only by the appended claims. It will be apparent to one of ordinary skill in the art that the embodiments may be practiced without some of these specific details. In other instances, certain structures and devices are omitted or simplified to avoid obscuring the details of the various embodiments. As used herein, a 'set' refers to any whole number of items including one item.

Embodiments of the present invention are related to the implementation of processes described in U.S. Patent Application Ser. Nos. 61/026,453, 12/140,829 and 11/331,814. The aforementioned processes involve processing a 2-D separable transform on various blocks of pixels where the block size is equal to the size of the transform. In one embodiment, the blocks used in the transform can overlap with each other. Therefore, each pixel can be represented in the transform coefficients of multiple blocks. In another embodiment, the blocks can also scaled using weights adapted to the block statistics. For this type of transform, the forward transform is called a forward weight-adaptive over-complete transform and the inverse is called an inverse weight-adaptive over-complete transform.

Forward and Inverse Transforms

Figure 1:
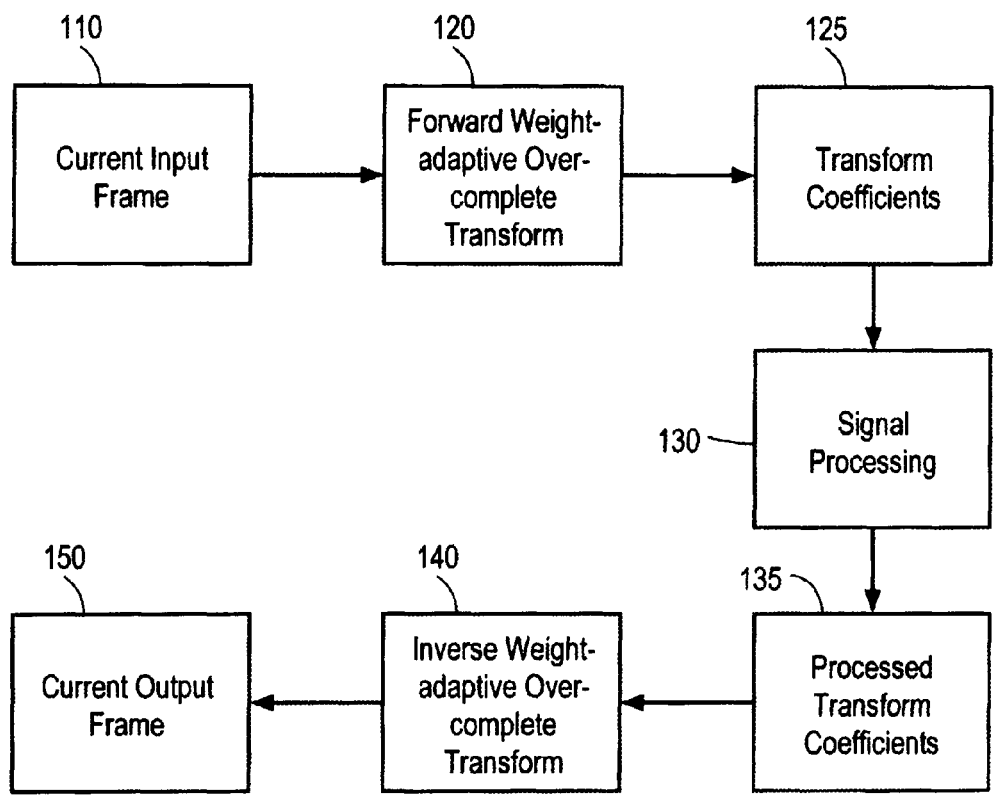
FIG. 1 is a diagram of one embodiment of a system for performing a forward and inverse weight-adaptive over-complete transform.

FIG. 1 illustrates one embodiment of a system 100 for performing forward and inverse weight-adaptive over-complete transforms in conjunction with the above described signal processing techniques. Each of the blocks in FIG. 1 may comprise hardware (circuitry, dedicated logic, etc.), software (such as is run on a general purpose computer system or a dedicated machine), or a combination of both.

In one embodiment, current input frame 110 is received as an input to forward weight-adaptive over-complete transform module 120. The current input frame 110 may represent image data or video data. Forward weight-adaptive over-complete transform module 120 performs a forward weight-adaptive over-complete transform on the input frame and outputs transform coefficients 125. Transform coefficients 125 are then received as input to signal processing module 130.

Signal processing module 130 performs one or more data processing operations on transform coefficients 125. In one embodiment, these operations include, but are not limited to, those described in U.S. Patent Application Ser. No. 61/026,453, entitled "Flicker Reduction in Video Sequences Using Temporal Processing," filed on Feb. 5, 2008; application Ser. No. 12/140,829, entitled "Image/Video Quality Enhancement and Super Resolution Using Sparse Transformations," filed on Jun. 17, 2008 and U.S. application Ser. No. 11/331,814, entitled "Nonlinear, In-The-Loop, Denoising Filter For Quantization Noise Removal For Hybrid Video Compression," filed on Jan. 12, 2006. Processed transform coefficients 135 are then output by signal processing module 130 and received as input to inverse weight-adaptive over-complete transform module 140.

The inverse weight-adaptive over-complete transform module 140 performs an inverse weight-adaptive over-complete transform on processed transform coefficients 135 to produce current output frame 150 as an output. Current output frame 150 represents a processed image/video frame that has undergone signal processing in the transform domain along with the forward and inverse weight-adaptive over-complete transform operations.

Note that in one embodiment, current input frame 110 is upsampled prior to being transformed by the forward weight-adaptive over-complete transform 120. Also in one embodiment, the output of inverse transform 140 undergoes a data consistency operation.

Forward Weight-Adaptive Over-Complete Transform

Figure 2A:
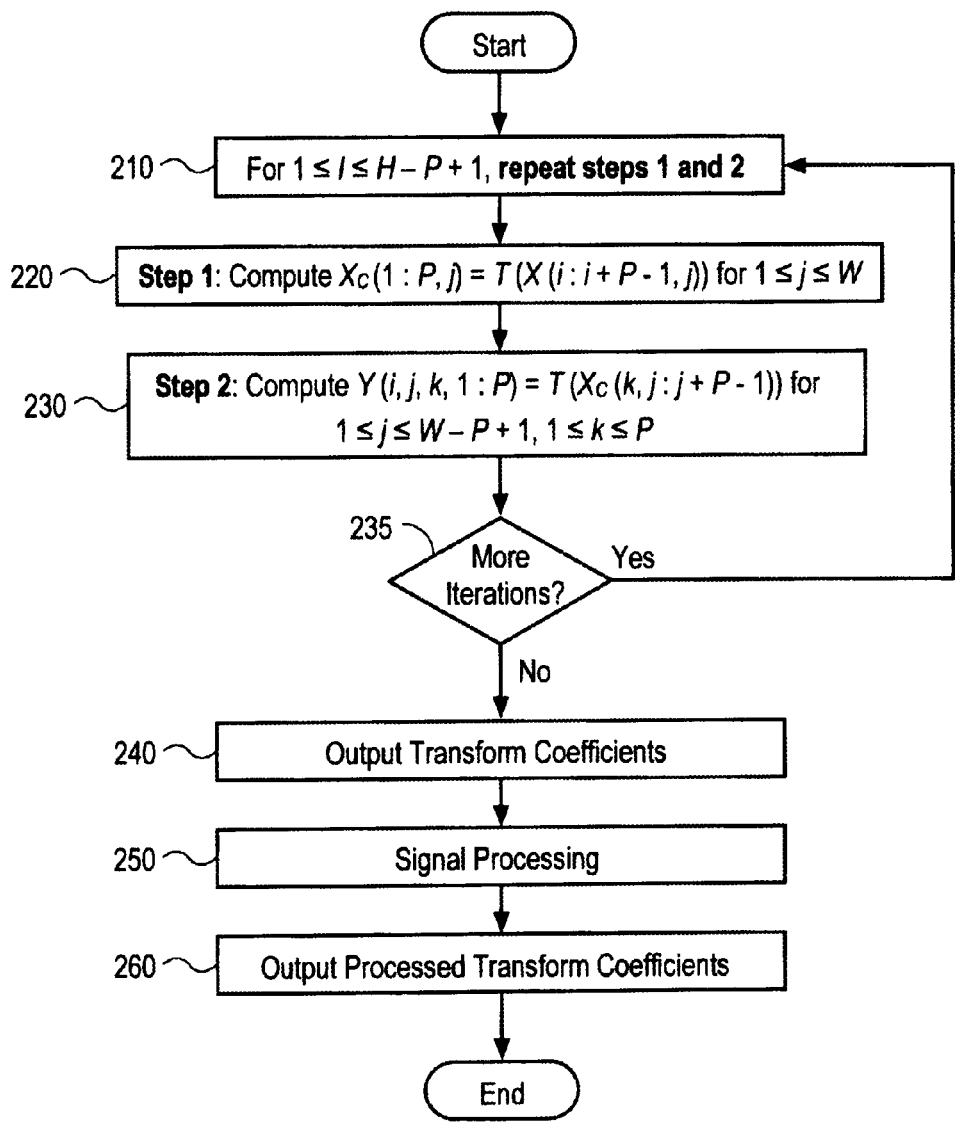
FIG. 2A is a flow diagram of one embodiment of a process for performing a forward weight-adaptive over-complete transform and optionally applying signal processing to obtain processed transform coefficients.

FIG. 2A is a flow diagram of one embodiment of a process 200 for performing a forward weight-adaptive over-complete transform and applying signal processing to obtain processed transform coefficients. The process may be performed by processing logic that may comprise hardware (e.g., circuitry, dedicated logic, etc.), software (such as is run on a general purpose computer system or a dedicated machine), or a combination of both.

In one embodiment, mathematical notation $X(i, j)$ denotes the $(i, j)^{th}$ pixel in an input image/video frame and $Y(i, j, m, n)$ denotes the $(m, n)^{th}$ coefficient in a 2-D transform of a P×P block in X with top-left pixel represented as $(i, j)$. Therefore, mathematical notation $Y(i, j, m, n)$ represents the weight-adaptive over-complete transform of $X(i, j)$.

In one embodiment, variable P denotes the size of the transform and, as a result, the mathematical relationship between variables m, n, and P can be represented as $1 \leq m, n \leq P$. Variables H and W then denote the height and width of the input image/video frame. For purposes of notation, the symbol ':' is used to describe a range in the indices of a variable. An example is $X(i, j:j+P-1)$ which represents the 1×P vector $[X(i, j) \; X(i, j+1) \ldots X(i, j+P-1)]$. Similarly, mathematical notation $X(i:i+P-1, j:j+P-1)$ represents a matrix of size P×P.

Referring to FIG. 2A, process 200 starts in a loop for $1 \leq i \leq H-P+1$ (processing block 210). Processing logic performs a one dimensional (1-D) transform on the columns of the input frame to obtain a column transform (processing block 220). In one embodiment, this operation may be represented by the mathematical notation:

$$X_C(1:P, j) = T(X(i:i+P-1, j)) \text{ for } 1 \leq j \leq W,$$

where $T(\;)$ represents the 1-D forward transform operation. $X_C$ is a buffer with a size P×W that is used internally in the forward weight-adaptive over-complete transform operation.

At processing block 230, processing logic performs a 1-D transform on the rows of the column transform. In one embodiment, this operation may be represented by the following mathematical notation:

$$Y(i, j, k, 1:P) = T(X_C(k, j:j+P-1)) \text{ for } 1 \leq j \leq W-P+1 \text{ and } 1 \leq k \leq P.$$

In one embodiment, the 1-D forward transform operation $T(\;)$ is defined as $$T(x) = \begin{cases} H_T * x, & x \text{ is a vector of size } P \times 1 \\ x * H_T^T, & x \text{ is a vector of size } 1 \times P \end{cases}.$$

that defines the transform.

At processing block 235, if there are more iterations, processing in the loop returns to processing block 210 to repeat the operations in blocks 220 and 230. When there are no more iterations, at processing block 240, processing logic outputs the transform coefficients.

Next, processing logic performs a signal processing operation (processing block 250). This is optional. In one embodiment, the signal processing operation may be one of the signal processing operations as disclosed in U.S. Patent Application Ser. Nos. 61/026,453, 12/140,829 and 11/331,814. At block 260, processing logic outputs the processed transform coefficients.

Figure 2B:
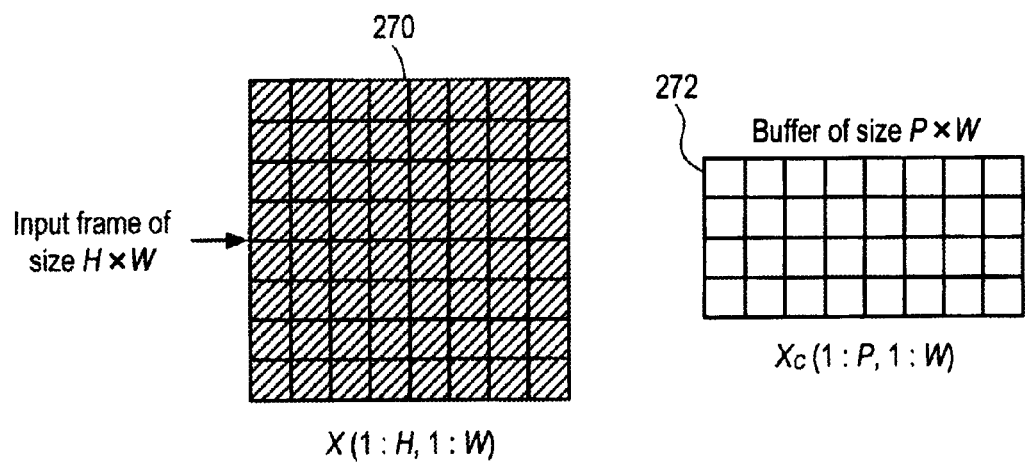
FIG. 2B is a diagram of embodiments of an input image/video frame and a buffer

FIG. 2B illustrates embodiments of the input image/video frame and buffer that are involved in the processing described above in FIG. 2A. In one embodiment, input frame 270 comprises pixel data represented as rows and columns with a height H and width W. Buffer 272 represents a buffer with a height P and width W that is used in the transform operations described in FIG. 2A. In one embodiment, variable P corresponds to the size of the transform.

Figure 2C:
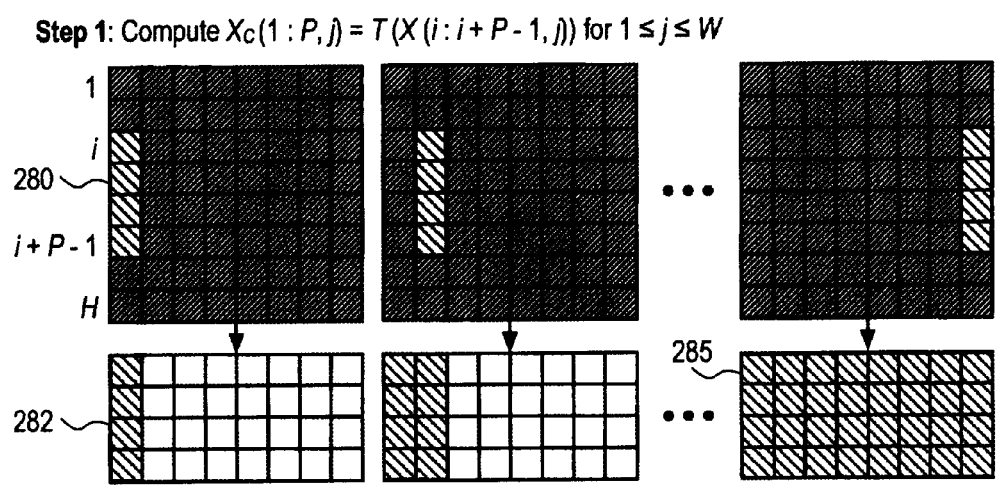
FIG. 2C is a diagram of one embodiment of an operation performed in block 220 in FIG. 2A.

FIG. 2C illustrates in more detail the operation corresponding to processing block 220 in FIG. 2A. In one embodiment, the 1-D forward transform is performed on the columns of input frame 280 that has a height H and width W. Buffer 282 having a height P and width W is updated with the transform coefficients from the 1-D forward operation of each column. Buffer 282 is shown with the representation at different stages of the column transform computation.

Figure 2D:
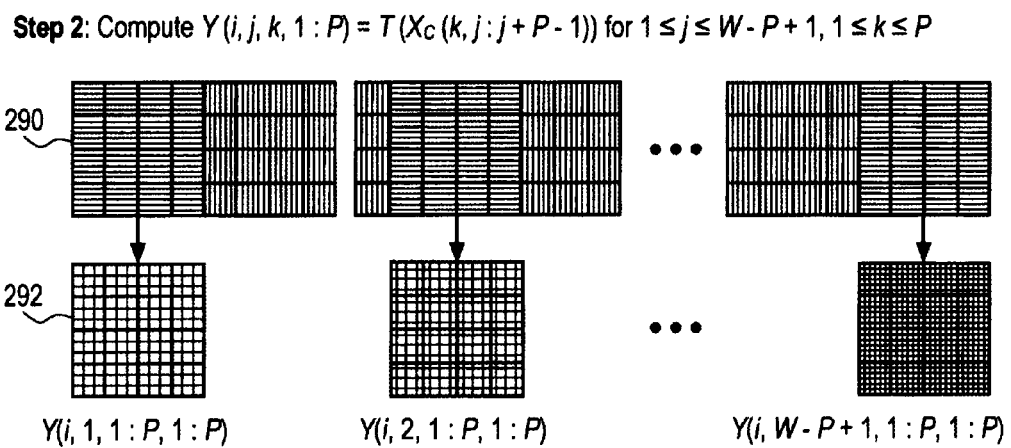
FIG. 2D is a diagram of one embodiment of an operation performed in block 230 in FIG. 2A.

FIG. 2D illustrates in more detail the operation corresponding to processing block 230 in FIG. 2A. In one embodiment, the 1-D forward transform is performed on the rows of column transform in buffer 290. Buffer 290 is same as buffer 282. In this manner, 2-D transform coefficients 292 may be obtained by the 1-D forward transform on column transform coefficients stored in buffer 290.

In another embodiment, $$H_T = \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

where $H_T$ corresponds to a 4×4 Hadamard transform with elements from the set $\{-1,1\}$. In this embodiment, the operation represented by T( ) can be computed with addition operations. In another embodiment, $$H_T = \begin{bmatrix} 1 & 1 & 1 \\ 1 & 0 & -1 \\ 1 & -2 & 1 \end{bmatrix}$$

with P=3. In this embodiment, the operation can be computed with addition and shift operations.

In another embodiment, when $H_T$ corresponds to a Hadamard transform with elements from the set $\{-1,1\}$, a fast implementation, referred to as the Fast, Hadamard 2-D transform embodiment, to compute the forward weight-adaptive over-complete transform is described as follows:

compute $A(i,j)=X(i+P,j)-X(i,j)$ for $1 \le i \le H-P$, $1 \le j \le W$
compute $B(i,j)=A(i,j+P)-A(i,j)$ for $1 \le i \le H-P$, $1 \le j \le W-P$
compute $C(i,1,n)=H_T(n,1:P)*[A(i,1) A(i,2) \ldots A(i,P)]^T$ for $1 \le i \le H-P$, $1 \le n \le P$.

compute $C(i,j+1,n)=D_0(n) \times C(i,j,f(n))+D_1(n) \times B(i,j)$ for $1 \le i \le H-P$, $1 \le j \le W-P$ and $1 \le n \le P$, where the mapping $f(\ ):\{1,2,\ldots,P\} \to \{1,2,\ldots,P\}$ and the scalar values $D_0(n)$, $D_1(n)$ are determined such that $C(i,j+1,n)=H_T(n,1:P)*[A(i,j+1) A(i,j+2) \ldots A(i,j+P)]^T$.
compute $Y(1, j,1:P,1:P)=H_T*X(1:P, j:j+P-1)*H_T^T$ for $1 \le j \le W-P+1$.
compute $Y(i+1,j,m,n)=D_0(m) \times Y(i,j,f(m),n)+D_1(m) \times C(i,j,n)$ for $1 \le i \le H-P$, $1 \le j \le W-P+1$, $1 \le m \le P$ and $1 \le n \le P$, where the mapping $f(\ ):\{1,2,\ldots,P\} \to \{1,2,\ldots,P\}$ and the scalar values $D_0(m)$, $D_1(m)$ are determined such that $Y(i+1,j,1:P,1:P)=H_T*X(i+1:i+P, j:j+P-1)*H_T^T$.

In one embodiment, when $$H_T = \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$D_0 = D_1 = \begin{bmatrix} 1 \\ -1 \\ -1 \\ 1 \end{bmatrix} \text{ and } f\left(\begin{bmatrix} 1 \\ 2 \\ 3 \\ 4 \end{bmatrix}\right) = \begin{bmatrix} 1 \\ 4 \\ 3 \\ 2 \end{bmatrix}.$$

In yet another embodiment, when $H_T$ corresponds to a Hadamard transform with elements from the set $\{-1,1\}$, a fast method to compute the forward weight-adaptive over-complete transform is described as follows. In this embodiment, the 2-D weight-adaptive over-complete transform is computed by doing two (one for each dimension) 1-D weight-adaptive over-complete transform operations. The 1-D weight-adaptive over-complete transform operation is represented by $OT_1(\ )$ and the I/O characteristics of the operation is described by $$F(1:L_E-P+1,1:P)=OT_1(E(1:L_E)),$$

where E and F are variables representing the input and output vectors and $L_E$ is an integer indicating the length of the vector E. When $H_T$ represents a Hadamard transform, $P=2^p$, where p is an integer greater than zero.

In one embodiment, referred to as the Fast, Hadamard 1-D transform embodiment, a fast implementation for the 1-D weight-adaptive over-complete transform operation, $OT_1(\ )$, is defined as follows:

set $E_0(i,1)=E(i)$
compute recursively for $1 \le j \le p-1$, $1 \le i \le L_E-j$ and $1 \le n \le 2^{j-1}$
$E_j(i,2*n-1)=E_{j-1}(i,n)+E_{j-1}(i+1,n)$
$E_j(i,2*n)=E_{j-1}(i,n)-E_{j-1}(i+1,n)$
compute $F(i,m)=D_0'(m)*E_{p-1}(i,f_0'(m))+D_1'(m)*E_{p-1}(i+2^{p-1},f_1'(m))$ for $1 \le i \le L_E-P+1$ and $1 \le m \le P$, where the mappings $f_0'(\ ):\{1,2,3,\ldots,2^p\} \to \{1,2,3,\ldots,2^{p-1}\}$, $f_1'(\ ):\{1,2,3,\ldots,2^p\} \to \{1,2,3,\ldots,2^{p-1}\}$ and the scalar values $D_0'(m)$, $D_1'(m)$ are determined such that $F(i,m)=H_T(m,1:P)*[E(i) E(i+1) \ldots E(i+P-1)]^T$.

In one embodiment, when $$H_T = \begin{bmatrix} 1 & 1 & 1 & 1 \\ 1 & 1 & -1 & -1 \\ 1 & -1 & 1 & -1 \\ 1 & -1 & -1 & 1 \end{bmatrix}, D_0' = \begin{bmatrix} 1 \\ 1 \\ 1 \\ 1 \end{bmatrix}, D_1' = \begin{bmatrix} 1 \\ -1 \\ 1 \\ -1 \end{bmatrix} \text{ and}$$

$$f_0'\left(\begin{bmatrix}1\\2\\3\\4\end{bmatrix}\right) = f_1'\left(\begin{bmatrix}1\\2\\3\\4\end{bmatrix}\right) = \begin{bmatrix}1\\1\\2\\2\end{bmatrix}.$$

In one embodiment, the 2-D weight-adaptive over-complete transform is computed using two 1-D transform operations as follows:

(1) compute $X_1(1:H-P+1, j,1:P) = OT_1(X(1:H, j))$ for $1 \le j \le W$ (2) compute $Y(i,1:W-P+1, m,1:P) = OT_1(X_1(i,1:W, m))$ for $1 \le i \le H-P+1$ and $1 \le m \le P$.

The order in which the two dimensions are processed can be changed without loss of generality. That is, the above equations are given for computing 1-D transform in the column direction first followed by a 1-D transform in the row direction. A similar set of equations can be written for computing 1-D transform in the row direction first followed by a 1-D transform in the column direction.

Inverse Weight-Adaptive Over-Complete Transform

Figure 3A:
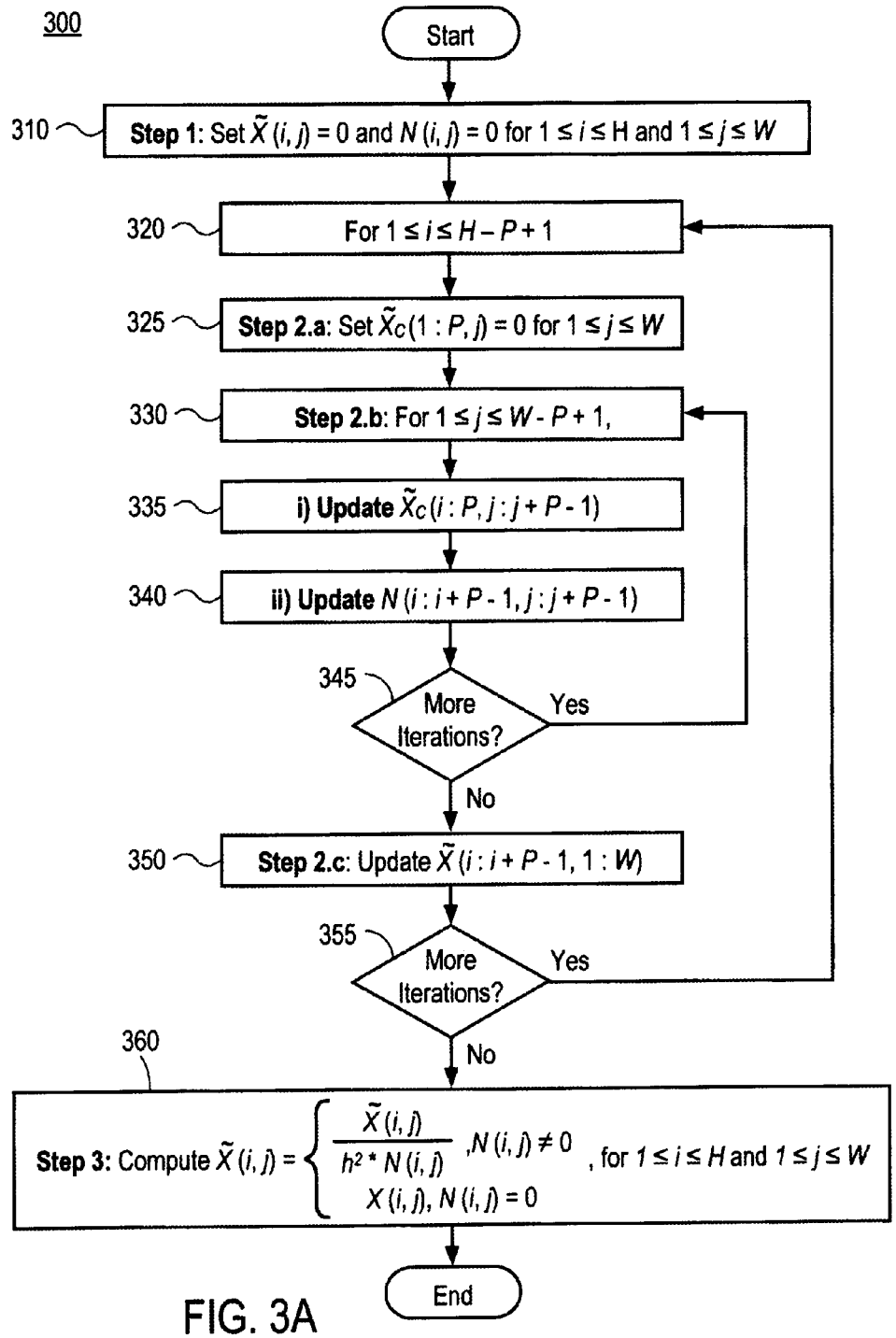
FIG. 3A is a flow diagram of one embodiment of a process for performing an inverse weight-adaptive over-complete transform.

FIG. 3A illustrates one embodiment of a process 300 for performing an inverse weight-adaptive over-complete transform. The process is performed by processing logic that may comprise hardware (e.g., circuitry, dedicated logic, etc.), software (such as is run on a general purpose computer system or a dedicated machine), or a combination of both.

In one embodiment, the mathematical notation $\tilde{Y}(i, j, m, n)$ denotes a processed version of transform coefficients $Y(i, j, m, n)$ and $\tilde{X}(i, j)$ denotes the inverse weight-adaptive over-complete transform of $\tilde{Y}(i, j, m, n)$. The mathematical notation $w(i, j)$ denotes a matrix of weights determined by the signal processing operation (e.g., performed by signal processing module 130 in FIG. 1 or block 250 in FIG. 2A) that may generate the processed transform coefficients $\tilde{Y}(i, j, m, n)$ from the transform coefficients $Y(i, j, m, n)$.

Referring to FIG. 3A, the process begins by processing logic initializing buffers that are used for the inverse transform operation (processing block 310). In one embodiment, this operation may be represented by the notation:

Set $\tilde{X}(i, j) = 0$ and $N(i, j) = 0$ for $1 \le i \le H$ and $1 \le j \le W$.

where N represents a buffer of size H×W that is used in the inverse weight-adaptive over-complete transform computation.

Next, processing logic begins performing a loop represented by the notation:

For $1 \le i \le H-P+1$ (processing block 320).

Then, processing logic initializes buffer $\tilde{X}_C$ (processing block 325). In one embodiment, buffer $\tilde{X}_C$ represents a buffer of size P×W used for the inverse weight-adaptive over-complete transform operation. In one embodiment, the initialization of buffer $\tilde{X}_C$ is represented by the notation:

Set $\tilde{X}_C(1:P, j) = 0$ for $1 \le j \le W$.

After initializing buffer $\tilde{X}_C$, processing logic enters another loop represented by notation:

For $1 \le j \le W-P+1$ (processing block 330).

Figure 3B:
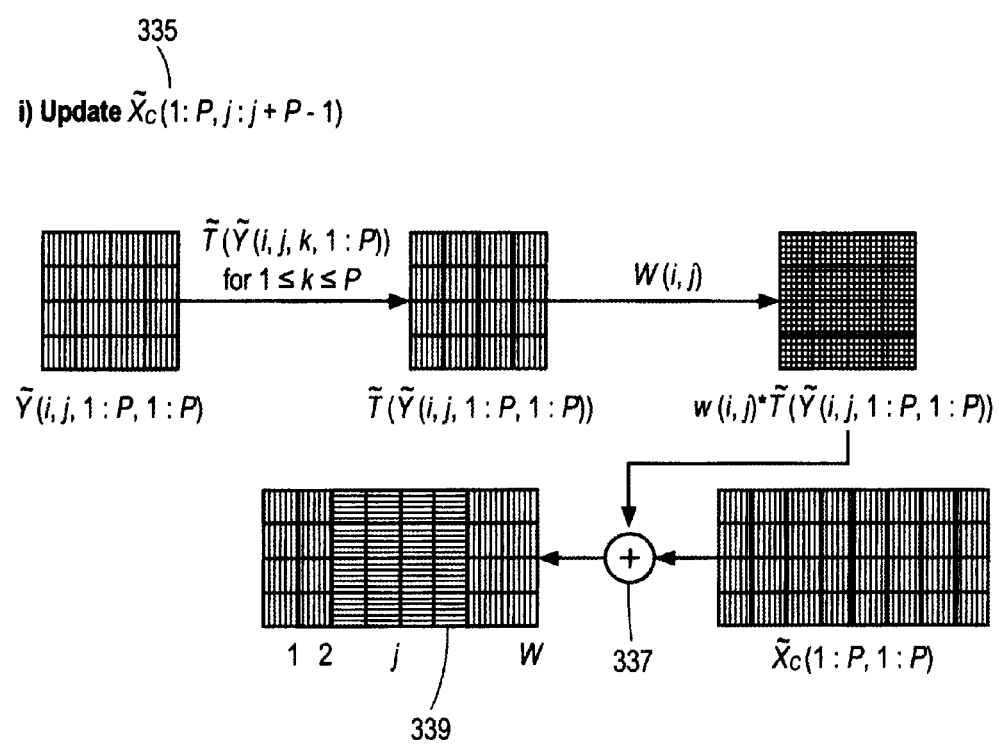
FIG. 3B is a diagram of one embodiment of an operation performed in block 335 in FIG. 3A.

In this loop, processing logic performs a weight-multiplication of a 1-D inverse transform of rows of the processed transform coefficients (processing block 335). This operation is performed as follows:

$\tilde{X}_C(k, j:j+P-1) = \tilde{X}_C(k, j:j+P-1) + w(i, j) * \tilde{T}(\tilde{Y}(i, j, k, 1:P))$ for $1 \le k \le P$, where $\tilde{T}()$ represents the 1-D inverse transform operation and $w(i, j)$ represents a matrix of weights. Buffer $\tilde{X}_C$ is then updated with the results of this operation. FIG. 3B illustrates in more detail the 1-D inverse transform operations of processing block 335 in FIG. 3A. In one embodiment, adder 337 adds the current contents of $\tilde{X}_C$ with the results of the 1-D inverse transform operation to produce the updated buffer $\tilde{X}_C$ (339).

At block 340, processing logic updates buffer N with the results of the operation in block 335 by adding $w(i, j)$. In one embodiment, this operation is performed as follows:

$N(i:i+P-1, j:j+P-1) = N(i:i+P-1, j:j+P-1) + w(i, j)$.

Figure 3C:
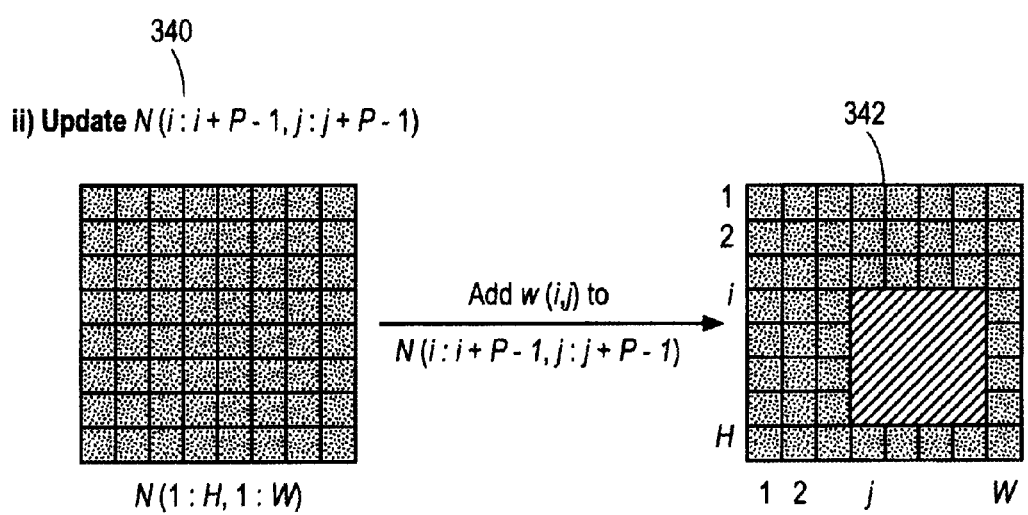
FIG. 3C is a diagram of one embodiment of an operation performed in block 340 in FIG. 3A.

FIG. 3C illustrates in more detail the operation performed in block 340 in FIG. 3A. In one embodiment, buffer 342 corresponds to the updated version of buffer N.

Referring back to FIG. 3A, processing logic tests whether additional iterations are necessary (processing block 345). If additional iterations are required, the process transitions to processing block 330 to perform additional operations. If no additional iterations are required, the process transitions to block 350 where processing logic performs an 1-D inverse transform of the columns of the buffer $\tilde{X}_C$ and updates buffer $\tilde{X}$ with the results of the 1-D inverse transform. In one embodiment, this operation is performed as follows:

$\tilde{X}(i:i+P-1, j) = \tilde{X}(i:i+P-1, j) + \tilde{T}(\tilde{X}_C(1:P, j))$ for $1 \le j \le W$.

Figure 3D:
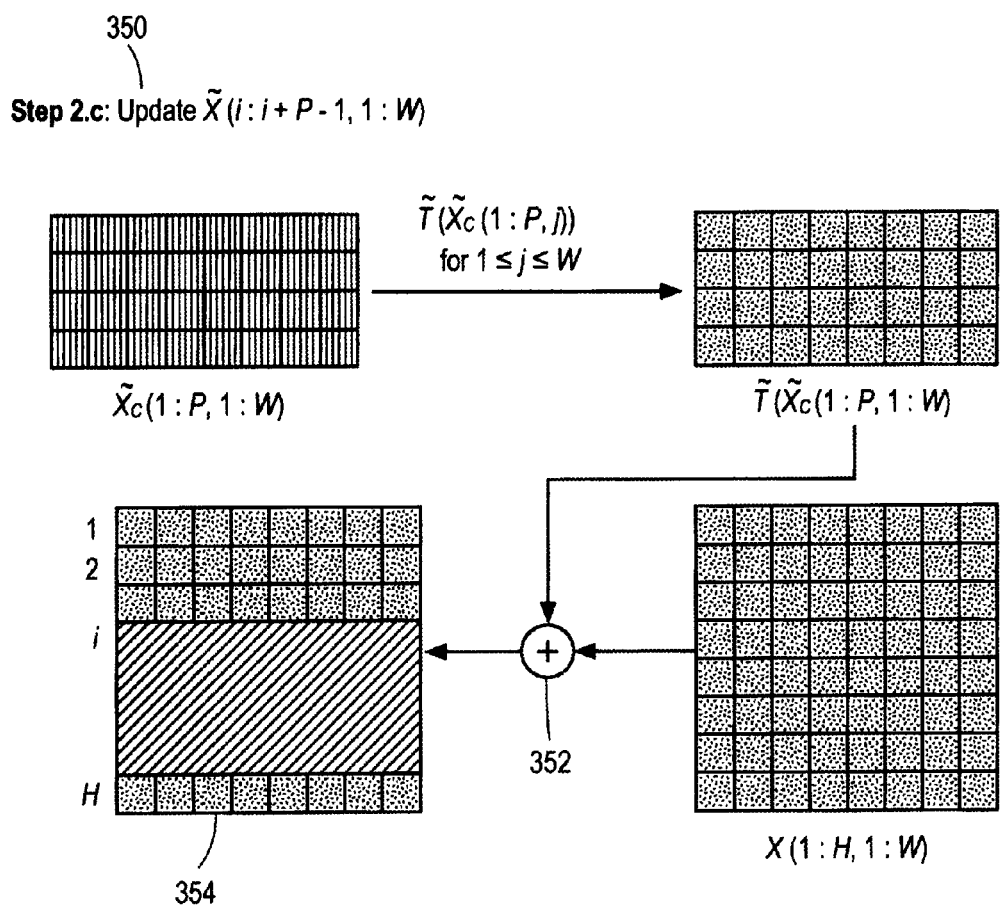
FIG. 3D is a diagram of one embodiment of an operation performed in block 350 in FIG. 3A.

FIG. 3D illustrates in more detail the operation performed in block 350 in FIG. 3A. In one embodiment, adder 352 adds the current contents of buffer $\tilde{X}$ with the results of the 1-D inverse transform operation to produce the updated buffer $\tilde{X}_C$ (354).

After updating $\tilde{X}_C$, processing logic tests whether there are more iterations (processing block 355). If so, the process transitions to processing block 320. If not, the process transitions to processing block 360.

At processing block 360, processing logic performs a division operation to obtain an output frame representing the processed image/video data. In one embodiment, this operation is represented by the following notation:

$$\tilde{X}(i, j) = \begin{cases} \dfrac{\tilde{X}(i, j)}{h^2 * N(i, j)}, & N(i, j) \ne 0 \\ X(i, j), & N(i, j) = 0 \end{cases} \text{ for } 1 \le i \le H \text{ and } 1 \le j \le W,$$

where h is defined as part of the 1-D inverse transform operation $\tilde{T}()$ below.

In one embodiment, the 1-D inverse transform operation $\tilde{T}()$ is defined as $$\tilde{T}(x) = \begin{cases} \tilde{H}_T * x, & x \text{ is a vector of size } P \times 1 \\ x * \tilde{H}_T^T, & x \text{ is a vector of size } 1 \times P \end{cases}.$$

Here $\tilde{H}_T$ is a P×P matrix such that $\tilde{H}_T * H_T = h * I$, where h is a real number and I is the identity matrix of size P×P. In another embodiment, $$\tilde{H}_T = \begin{bmatrix} 1 & 1 & 1 & 1 \\ 1 & 1 & -1 & -1 \\ 1 & -1 & 1 & -1 \\ 1 & -1 & -1 & 1 \end{bmatrix}$$

when $$H_T = \begin{bmatrix} 1 & 1 & 1 & 1 \\ 1 & 1 & -1 & -1 \\ 1 & -1 & 1 & -1 \\ 1 & -1 & -1 & 1 \end{bmatrix}.$$

In yet another embodiment, $$\tilde{H}_T = \begin{bmatrix} 2 & 3 & 1 \\ 2 & 0 & -2 \\ 2 & -3 & 1 \end{bmatrix}$$

when $$H_T = \begin{bmatrix} 1 & 1 & 1 \\ 1 & 0 & -1 \\ 1 & -2 & 1 \end{bmatrix}.$$

In one embodiment, the weight multiplication $w(i,j)*\tilde{T}(\tilde{Y}(i,j,k,1:P))$ is performed implicitly by the inverse transform operation $\tilde{T}(\ )$. To accomplish this, the inverse transform operation is done using $\tilde{H}_T(w)$ (a weight-adaptive $\tilde{H}_T$) which is designed such that $\tilde{H}_T(w) = w*\tilde{H}_T$. In one embodiment, the weight $w(i,j)$ is selected from a discrete set of values and the weight-adaptive $\tilde{H}_T(W)$ matrices, corresponding to each of the values in the discrete set, can be stored in a look-up table.

In one embodiment, the division operation $$\frac{\tilde{X}(i,j)}{h^2 * N(i,j)}$$

is approximated as, $$\frac{\tilde{X}(i,j)}{h^2 * N(i,j)} \approx \text{int}\left(\frac{\tilde{X}(i,j) * f(N(i,j)) + 2^{L-1}}{2^L}\right),$$

where $f(N(i,j))$ is a value stored in a look-up table. L is an integer greater than 0. In one embodiment, $$f(N(i,j)) = \text{int}\left(\frac{2^L}{h^2 * N(i,j)} + 0.5\right).$$

Exemplary System For Fast, Low-Memory Implementation

Figure 4:
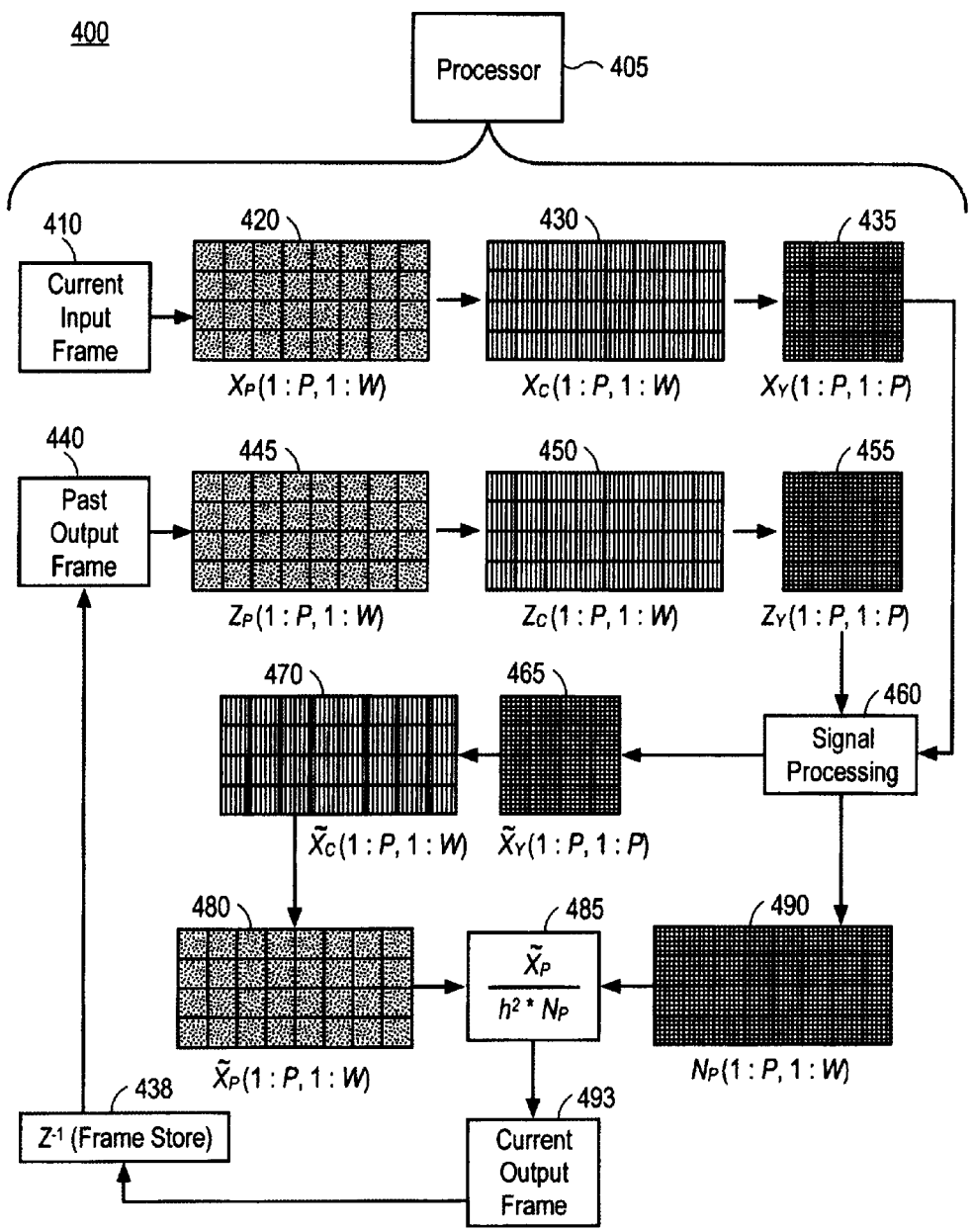
FIG. 4 is a diagram of one embodiment for a system for performing a forward weight-adaptive over-complete transform, processing in a transform domain and performing an inverse weight-adaptive over-complete transform simultaneously.

FIG. 4 illustrates one embodiment of a system 400 for performing the processes described in U.S. Provisional Application No. 61/026,453, entitled "Flicker Reduction in Video Sequences Using Temporal Processing," filed on Feb. 5, 2008, application Ser. No. 12/140,829, entitled "Image/Video Quality Enhancement and Super Resolution Using Sparse Transformations," filed on Jun. 17, 2008 and U.S. application Ser. No. 11/331,814, entitled "Nonlinear, In-The-Loop, Denoising Filter For Quantization Noise Removal For Hybrid Video Compression," filed on Jan. 12, 2006 as mentioned previously. Each of the blocks in FIG. 4 may comprise hardware (e.g., circuitry, dedicated logic, etc.), software (such as is run on a general purpose computer system or a dedicated machine), or a combination of both. In one embodiment, the processes are implemented on processor 405. In one embodiment, processor 405 is a Single Instruction, Multiple Data (SIMD) processor in such a way that multiple data units undergoing the same operation are processed all at once. The SIMD processor has one or more sub-processors and each sub-processor can run one or more threads simultaneously. These processes can be implemented to minimize memory requirements and memory I/O operations.

In one embodiment, the computation of the forward weight-adaptive over-complete transform, processing of coefficients in the transform domain and the computation of the inverse weight-adaptive over-complete transform is done simultaneously as described in the following discussion. In one embodiment, variable X represents current input frame 410 and $\tilde{X}$, Z represent current output frame 493 and past output frame 440, respectively. In one embodiment, system 400 includes buffers that are used to implement these processes. These buffers include the following as shown in FIG. 4:

$X_p$—buffer 420 of size P×W containing P rows of the current input frame 410 of X.

$X_C$—buffer 430 of size P×W.

$Z_p$—buffer 445 of size P×W containing P rows of the past output frame 440 of Z. This buffer is not required for the processes described in U.S. patent application Ser. No. 12/140,829, entitled "Image/Video Quality Enhancement and Super Resolution Using Sparse Transformations," filed on Jun. 17, 2008 and Ser. No. 11/331,814, entitled "Nonlinear, In-The-Loop, Denoising Filter For Quantization Noise Removal For Hybrid Video Compression," filed on Jan. 12, 2006.

$Z_C$—buffer 450 of size P×W. This buffer is not required for the processes described in U.S. patent application Ser. No. 12/140,829, entitled "Image/Video Quality Enhancement and Super Resolution Using Sparse Transformations," filed on Jun. 17, 2008 and Ser. No. 11/331,814, entitled "Nonlinear, In-The-Loop, Denoising Filter For Quantization Noise Removal For Hybrid Video Compression," filed on Jan. 12, 2006.

$\tilde{X}_C$—buffer 470 of size P×W.

$\tilde{X}_p$—buffer 480 of size P×W containing P rows of the current output frame 493 of $\tilde{X}$.

$N_p$—buffer 490 of size P×W.

$X_Y$—buffer 435 of size P×P.

$Z_Y$—buffer 455 of size P×P. This buffer is not required for the processes described in U.S. patent application Ser. No. 12/140,829, entitled "Image/Video Quality Enhancement and Super Resolution Using Sparse Transformations," filed on Jun. 17, 2008 and Ser. No. 11/331,814, entitled "Nonlinear, In-The-Loop, Denoising Filter For Quantization Noise Removal For Hybrid Video Compression," filed on Jan. 12, 2006.

$\tilde{X}_Y$—buffer 465 of size P×P.

In one embodiment, the past output frame 440 is stored in frame store buffer 438.

In one embodiment, a fast and low-memory implementation of the processes includes the following operations:

1. Buffer Initialization
   a. Copy the first P rows of the current input frame 410 of X into buffer 420 of $X_p$.
   b. Copy the first P rows of the past output frame 440 of Z into buffer 445 of $Z_p$.

c. Set buffer 480 of $\tilde{X}_p(i,j)=0$ and buffer 490 of $N_p(i,j)=0$ for $1 \le i \le P$ and $1 \le j \le W$.
2. Main Loop. For $1 \le i \le H-P+1$, perform the following operations:
   a. Calculate forward transforms in the column direction on data in buffers 420 and 445 with the results being stored in buffers 430 and 450, respectively, as represented by the notation:

$X_C(1:P,j)=T(X_p(1:P,j))$ and $Z_C(1:P,j)=T(Z_p(1:P,j))$ for $1 \le j \le W$.

b. Set buffer 470 of $\tilde{X}_C(i,j)=0$ for $1 \le i \le P$ and $1 \le j \le W$.
   c. For $1 \le j \le W-P+1$, perform the following operations:
      i. Calculate a forward transform in the row direction on data in buffer 430 and store the results in buffer 435, as represented by the notation:

$X_Y(k,1:P)=T(X_C(k,j:j+P-1))$ for $1 \le k \le P$.

ii. Calculate a forward transform in the row direction on data in buffer 450 and store the results in buffer 455, as represented by the notation:

$X_Z(k,1:P)=T(Z_C(k,j:j+P-1))$ for $1 \le k \le P$.

iii. Calculate a processed buffer 465 of $\tilde{X}_Y(1:P,1:P)$ and a matrix of weights $w(i,j)$ in signal processing module 460 from buffer 435 of $X_Y(1:P,1:P)$ and buffer 455 of $Z_Y(1:P,1:P)$ using one (or more) of the processes described in U.S. Patent Application No. 61/026,453, entitled "Flicker Reduction in Video Sequences Using Temporal Processing," filed on Feb. 5, 2008, Ser. No. 12/140,829, entitled "Image/Video Quality Enhancement and Super Resolution Using Sparse Transformations," filed on Jun. 17, 2008 and Ser. No. 11/331,814, entitled "Nonlinear, In-The-Loop, Denoising Filter For Quantization Noise Removal For Hybrid Video Compression," filed on Jan. 12, 2006.
      iv. Calculate an inverse transform in the row direction on coefficients in buffer 465 based on a weight multiplication of the inverse transform, the results of which are then updated in buffer 470, as represented by the following notation:

$\tilde{X}_C(k,j:j+P-1)=\tilde{X}_C(k,j:j+P-1)+w(i,j)*\tilde{T}(\tilde{X}_Y(k,1:P))$ for $1 \le k \le P$.

v. Update buffer 490, as represented by the following notation:

$N_p(1:P,j:j+P-1)=N_p(1:P,j:j+P-1)+w(i,j)$.

d. Calculate an inverse transform in the column direction for data in buffer 470, the results of which are then updated in buffer 480, as represented by the following notation:

$\tilde{X}_p(1:P,j)=\tilde{X}_p(1:P,j)+\tilde{T}(\tilde{X}_C(1:P,j))$ for $1 \le j \le W$.

e. Perform a division operation in divider 485, as represented by the following notation:

$$\tilde{X}_p(1,j) = \begin{cases} \dfrac{\tilde{X}_p(1,j)}{h^2 * N_p(1,j)}, & N_p(1,j) \ne 0 \\ X_p(1,j), & N_p(1,j) = 0 \end{cases} \text{ for } 1 \le j \le W.$$

f. Copy the first row of buffer 480 $\tilde{X}_p(1,1:W)$ into row $i$ of current output frame 493 of $\tilde{X}$.

g. Rotate/Update Buffers. Rotation is employed to reuse the same space in the buffer to hold different data corresponding to the frame at different times.
      i. For $1 \le k \le P-1$, perform the following operations:
         1. Rotate/update buffer 420 as follows:

$X_p(k,1:W)=X_p(k+1,1:W)$

2. Rotate/update buffer 445 as follows:

$Z_p(k,1:W)=Z_p(k+1,1:W)$

3. Rotate/update buffer 480 as follows:

$\tilde{X}_p(k,1:W)=\tilde{X}_p(k+1,1:W)$

4. Rotate/update buffer 490 as follows:

$N_p(k,1:W)=N_p(k+1,1:W)$ ii. Copy row $i+P$ of the current input frame 410 of X into row P of buffer 420 $X_p(P,1:W)$
      iii. Copy row $i+P$ of the past output frame 440 of Z into row P of buffer 445 $Z_p(P,1:W)$
      iv. Set row P of buffer 480 and row P of buffer 490 to zero i.e. $\tilde{X}_p(P,j)=0$ and $N_p(P,j)=0$ for $1 \le j \le W$
      Note that in operations 2.g.i.3 and 2.g.i.4, the entire buffer is not modified. The operations 2.g.i.3 and 2.g.i.4 operate on rows 1 to P−1 while operation 2.g.iv operates on row P.
3. Output last P−1 rows. For $1 \le i \le P-1$, perform the following operations:
   a. Perform a division operation, as represented by the following notation:

$$\tilde{X}_p(i,j) = \begin{cases} \dfrac{\tilde{X}_p(i,j)}{h^2 * N_p(i,j)}, & N_p(i,j) \ne 0 \\ X_p(i,j), & N_p(i,j) = 0 \end{cases} \text{ for } 1 \le j \le W.$$

b. Copy row $i$ of buffer 480 $\tilde{X}_p(i,1:W)$ into row $i+H-(P-1)$ of current output frame 493 of $\tilde{X}$.

As set forth above, in one embodiment, the forward and inverse transforms are applied simultaneously. In the steps above, the forward transform, transform domain processing and the inverse transform are all performed in a loop under Step 2. Instead of doing the forward transform on the entire frame and then pass the entire set of transformed coefficients for processing and then doing an inverse on the entire set of processed transformed coefficients, the three operations (forward, processing, inverse) are performed on a small part of the frame, then the same memory is used to repeat the three steps on a different small part of the frame and so on. Because of this, the amount of memory required is reduced since the entire set of transformed coefficients is never stored at any one instance.

In one embodiment, current output frame 493 may be stored in frame store buffer 438. In another embodiment, the forward and inverse transform operations described above in connection with FIG. 4 are respective forward and inverse weight-adaptive over-complete transform operations.

In another embodiment of the fast, low-memory embodiment, the 2-D buffers are formed using 1-D buffers. For example, a P×W 2-D buffer is formed using P 1-D buffers, each of length W. With this buffer architecture, the rotation of buffers in step 2.g ('Rotate/Update Buffers') described above can be done by simply reorganizing the order of the 1-D buffers in the 2-D buffer without copying data from one part of the 2-D buffer to another part.

In another embodiment of the fast, low-memory embodiment, the step 2.b described above that initializes buffer $\tilde{X}_C$ to zero can be eliminated by modifying step 2.c.iv as follows:

---

For $1 \leq k \leq P$,
   Let $\tilde{x}_k$ represent the output of $\tilde{T}(\tilde{X}_Y(k, 1:P))$.
   If ( j is equal to 1)
      $\tilde{X}_C(k, j:j+P-1) = w(i,j) * \tilde{x}_k$.
   Else
      $\tilde{X}_C(k, j:j+P-2) = \tilde{X}_C(k, j:j+P-2) + w(i,j) * \tilde{x}_k(1:P-1)$.
      $\tilde{X}_C(k, j+P-1) = w(i,j) * \tilde{x}_k(P)$.

---

The techniques described above involve processing P rows at a time. However, it is to be noted that this is without loss of generality and the techniques can be trivially modified (by interchanging the row and column dimension) to process P columns at a time.

In one embodiment, the processes described in U.S. Patent Application Nos. 61/026,453, 12/140,829 and 11/331,814 are implemented using integer arithmetic. In another embodiment, the processes described in aforementioned U.S. Patent Applications are implemented using fixed-point arithmetic. In one embodiment, the precision of the fixed-point arithmetic is equal to 16 bits. For both the integer and fixed-point arithmetic implementations, the intermediate data in the implementation is scaled whenever necessary to prevent overflow problems arising out of the integer and fixed-point representations.

In one embodiment, the processes described in U.S. Patent Application Nos. 61/026,453, 12/140,829 and 11/331,814 are highly parallelized and can be designed to take advantage of any parallel computing resource. In one embodiment, the processes are implemented on a SIMD processor in such a way that multiple data units undergoing the same operation are processed all at once. A SIMD processor has one or more sub-processors and each sub-processor can run one or more threads simultaneously. For example, without loss of generality, each sub-processor computes $Y(i, j, 1:P, 1:P)$ for a particular value of i and all values of j; the task of each sub-processor is further divided into multiple threads where each thread does the computation for a particular value of j. In another embodiment, the processes are implemented on a multi-core processor such that the different cores perform the same operation on different data units or such that the different cores perform different operations or a combination of both.

An Exemplary Computer System

Figure 5:
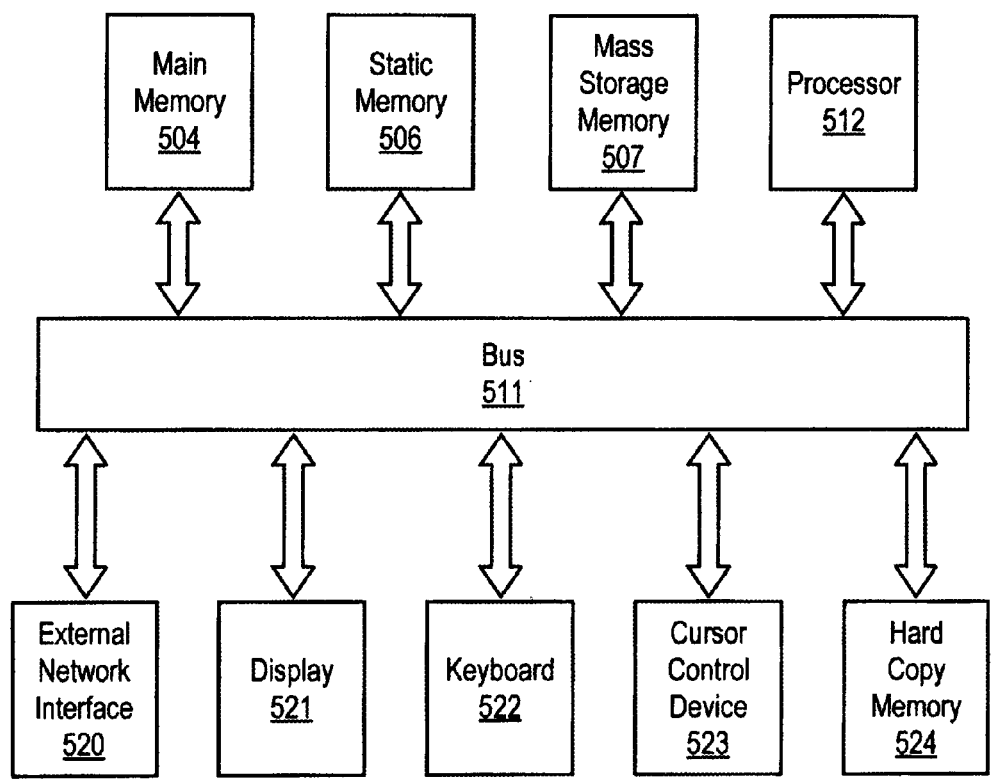
FIG. 5 is a diagram of one embodiment of an exemplary system that performs one or more of the operations described herein.

FIG. 5 is a block diagram of an exemplary computer system that may perform one or more of the operations described herein. Computer system 500 may comprise an exemplary client or server computer system. Components described with respect to the computer system may be part of a handheld or mobile device (e.g., a cell phone).

Referring to FIG. 5, computer system 500 comprises a communication mechanism or bus 511 for communicating information, and a processor 512 coupled with bus 511 for processing information. Processor 512 includes a microprocessor, but is not limited to a microprocessor, such as, for example, Pentium™ processor, etc.

System 500 further comprises a random access memory (RAM), or other dynamic storage device 504 (referred to as main memory) coupled to bus 511 for storing information and instructions to be executed by processor 512. Main memory 504 also may be used for storing temporary variables or other intermediate information during execution of instructions by processor 512.

Computer system 500 also comprises a read only memory (ROM) and/or other static storage device 506 coupled to bus 511 for storing static information and instructions for processor 512, and a data storage device 507, such as a magnetic disk or optical disk and its corresponding disk drive. Data storage device 507 is coupled to bus 511 for storing information and instructions.

Computer system 500 may further be coupled to a display device 521, such as a cathode ray tube (CRT) or liquid crystal display (LCD), coupled to bus 511 for displaying information to a computer user. An alphanumeric input device 522, including alphanumeric and other keys, may also be coupled to bus 511 for communicating information and command selections to processor 512. An additional user input device is cursor control 523, such as a mouse, trackball, trackpad, stylus, or cursor direction keys, coupled to bus 511 for communicating direction information and command selections to processor 512, and for controlling cursor movement on display 521.

Another device that may be coupled to bus 511 is hard copy device 524, which may be used for marking information on a medium such as paper, film, or similar types of media. Another device that may be coupled to bus 511 is a wired/wireless communication capability 525 to communication to a phone or handheld palm device.

Note that any or all of the components of system 500 and associated hardware may be used in the present invention. However, it can be appreciated that other configurations of the computer system may include some or all of the devices.

Applications

A Denoising Application

In one embodiment, the techniques described above, particularly the forward and inverse transforms, are used in a denoising filter process. Such a process may be used to remove quantization noise in hybrid video compression.

Figure 6:
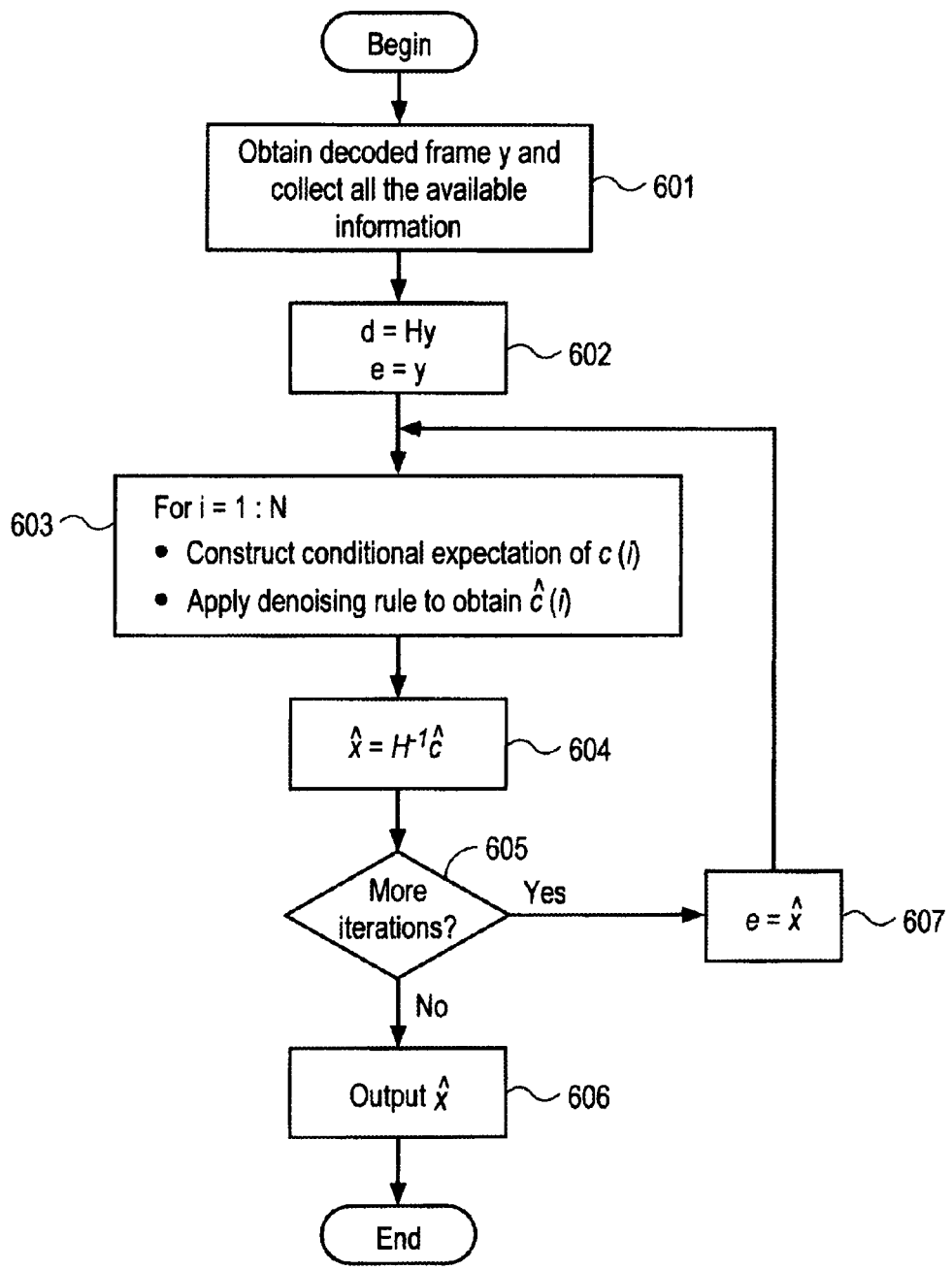
FIG. 6 is a flow diagram of one embodiment of a process for obtaining a denoised video frame.

FIG. 6 is a flow diagram of one embodiment of a process for obtaining a denoised video frame. The process is performed by processing logic that may comprise hardware (e.g., circuitry, dedicated logic, etc.), software (such as is run on a general purpose computer system or a dedicated machine), or a combination of both. Processing logic may comprise firmware. In one embodiment, the processing logic is in the denoising filter.

Referring to FIG. 6, the process begins by processing logic obtaining a decoded frame y and collecting other available information (processing block 601). The other available information may include quantization parameters, motion information, and mode information.

Then, processing logic obtains a set of coefficients d by applying a transform H to the decoded frame y (processing block 602). For example, the transform H may represent a block-wise two-dimensional DCT. Processing logic also sets a set of image elements e equal to the elements of y.

Afterwards, processing logic computes a conditional expectation of $c(i)$ for each coefficient in d based on the set of image elements e and obtains a filtered coefficient $\hat{c}(i)$ by applying a denoising rule using the value of the coefficient in d and the conditional expectation of $c(i)$ (processing block 603). Thereafter, processing logic obtains a filtered frame $\hat{x}$ by applying the inverse of transform H to the set of coefficients $\hat{c}$ (processing block 604).

After obtaining the filtered frame, processing logic determines whether more iterations are needed (processing block 605). For example, a fixed number of iterations such as two, may be preset. If more iterations are needed, processing logic sets the set of image elements e to $\hat{x}$ (processing block 607) and processing transactions to processing block 603. Otherwise, the processing flow proceeds to processing block 606 where the processing logic outputs the filtered frame $\hat{x}$.

While the above mentioned basic procedures that use a single linear transform H provide acceptable denoising performance, better performance can be obtained by using several different linear transforms, $H_1, H_2, \ldots, H_M$. Each of these transforms are used in a basic procedure of its own to produce estimates of the original unquantized video frame x given by $\hat{x}_1, \hat{x}_2, \ldots, \hat{x}_M$. These individual estimates are combined to form an overall estimate $\hat{x}$ that is better than each of the estimates. One embodiment of such a process using multiple transforms is illustrated in FIG. 7.

Figure 7:
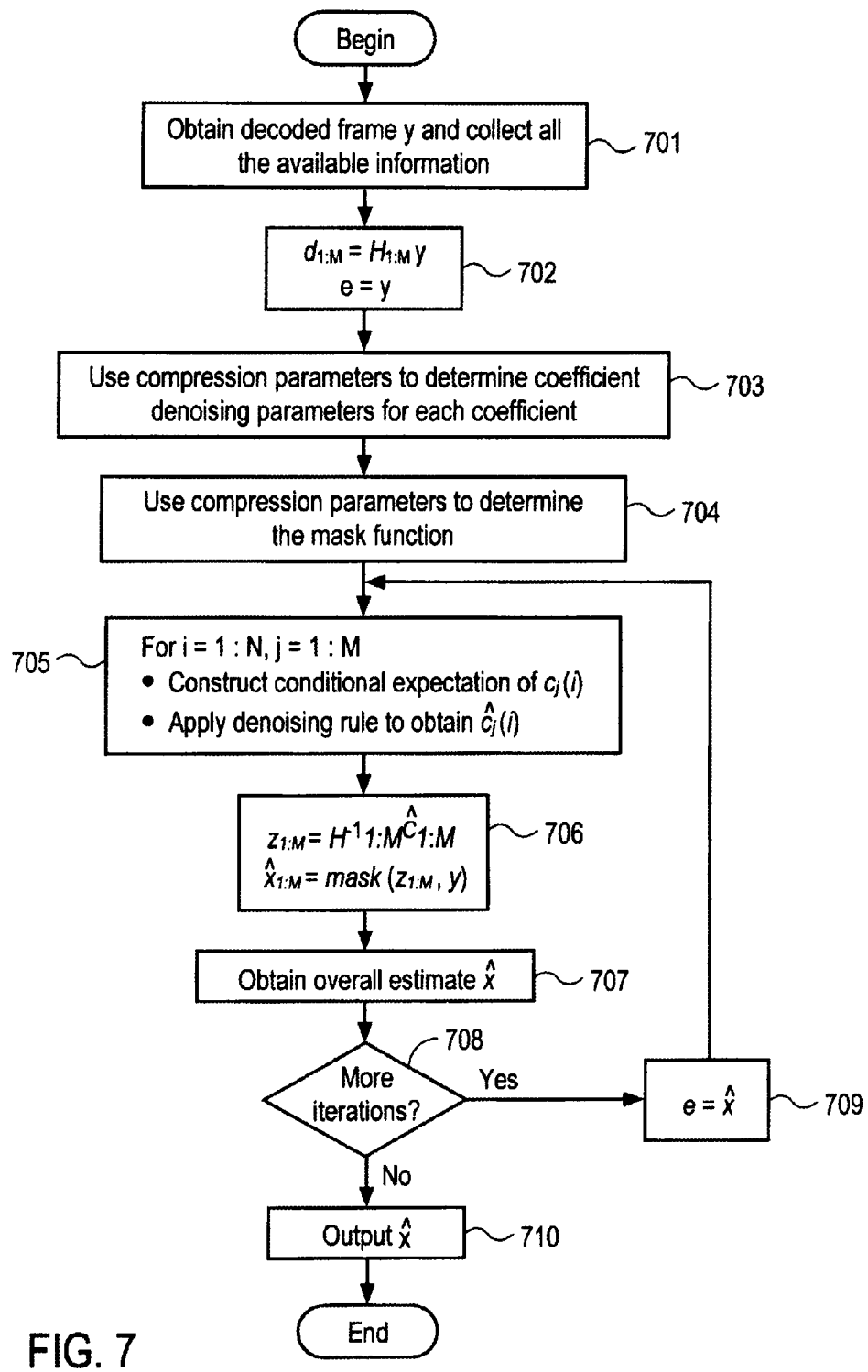
FIG. 7 is a block diagram of one embodiment of a process for obtaining a denoised video frame using a multitude of transforms.

The process of FIG. 7 is performed by processing logic that may comprise hardware (e.g., circuitry, dedicated logic, etc.), software (such as is run on a general purpose computer system or a dedicated machine), or a combination of both. Processing logic may comprise firmware. In one embodiment, the processing logic is part of a denoising filter.

Referring to FIG. 7, the process begins by processing logic obtaining a decoded frame y and collecting other available information (processing block 701). The other available information may include compression parameters such as quantization parameters, motion information, and mode information.

After obtaining the decoded frame and collecting other information, processing logic obtains a set of coefficients $d_{1:M}$ by applying M transforms $H_j$ to the decoded frame y (processing block 702). For example, each transform $H_j$ may represent a block-wise two-dimensional DCT, where the block alignment is dependent on j. Processing logic also sets a set of image elements e equal to the elements of y.

Processing logic then determines coefficient denoising parameters for each coefficient based on compression parameters (processing block 703) and determines a mask based on compression parameters (processing block 704).

With this information, processing logic computes a conditional expectation of $c_{1:M}(i)$ for each coefficient in $d_{1:M}$ based on e and coefficient parameters and obtains a filtered coefficient $\hat{c}_{1:M}(i)$ by applying a denoising rule using the value of the coefficient in $d_{1:M}$ and the conditional expectation of $c_{1:M}(i)$ (processing block 705).

Next, processing logic obtains filtered frames $\hat{x}_{1:M}(i)$ by applying the mask function to the result of the inverses of transforms $H_{1:M}$ applied to the set of coefficients $\hat{c}_{1:M}$ (processing block 706).

Processing logic then determines an overall estimate $\hat{x}$ (processing block 707). This may be performed by averaging all the estimates together. The averaging may be a weighted average. In one embodiment, the overall estimate block in FIG. 7 is given by weighted averaging of the individual estimates $\hat{x}_1, \hat{x}_2, \ldots, \hat{x}_M$. This can be done with equal weights or using more sophisticated weight determination techniques known in the art, such as, for example, the techniques set forth in Onur G. Guleryuz, "Weighted Overcomplete Denoising," Proc. Asilomar Conference on Signals and Systems, Pacific Grove, Calif., November 2003, which identifies three different weighting techniques. In one embodiment, the simplest of the three is used in the present invention. Therefore, an overall estimate is obtained, which is then masked. In an alternative embodiment, the individual estimates are masked and then an overall estimate is formed.

After obtaining the overall estimate, processing logic determines whether more iterations are needed (processing logic 708). For example, a fixed number of iterations such as two, may be preset. If more iterations are needed, processing logic sets the set of image elements e to $\hat{x}$ (processing block 709) and the process transitions to processing block 705;

otherwise, processing transitions to processing block 710 where processing logic outputs the filtered frame $\hat{x}$.

Note that the denoising process above, including operations therein, is described in more detail in U.S. patent application Ser. No. 11/331,814, entitled "Nonlinear, In-The-Loop, Denoising Filter For Quantization Noise Removal For Hybrid Video Compression," filed on Jan. 12, 2006.

Quality Enhancement and Super-Resolution

In one embodiment, the techniques described above, particularly the forward and inverse transforms, are used in a quality enhancement process or a super-resolution process.

Figure 8:
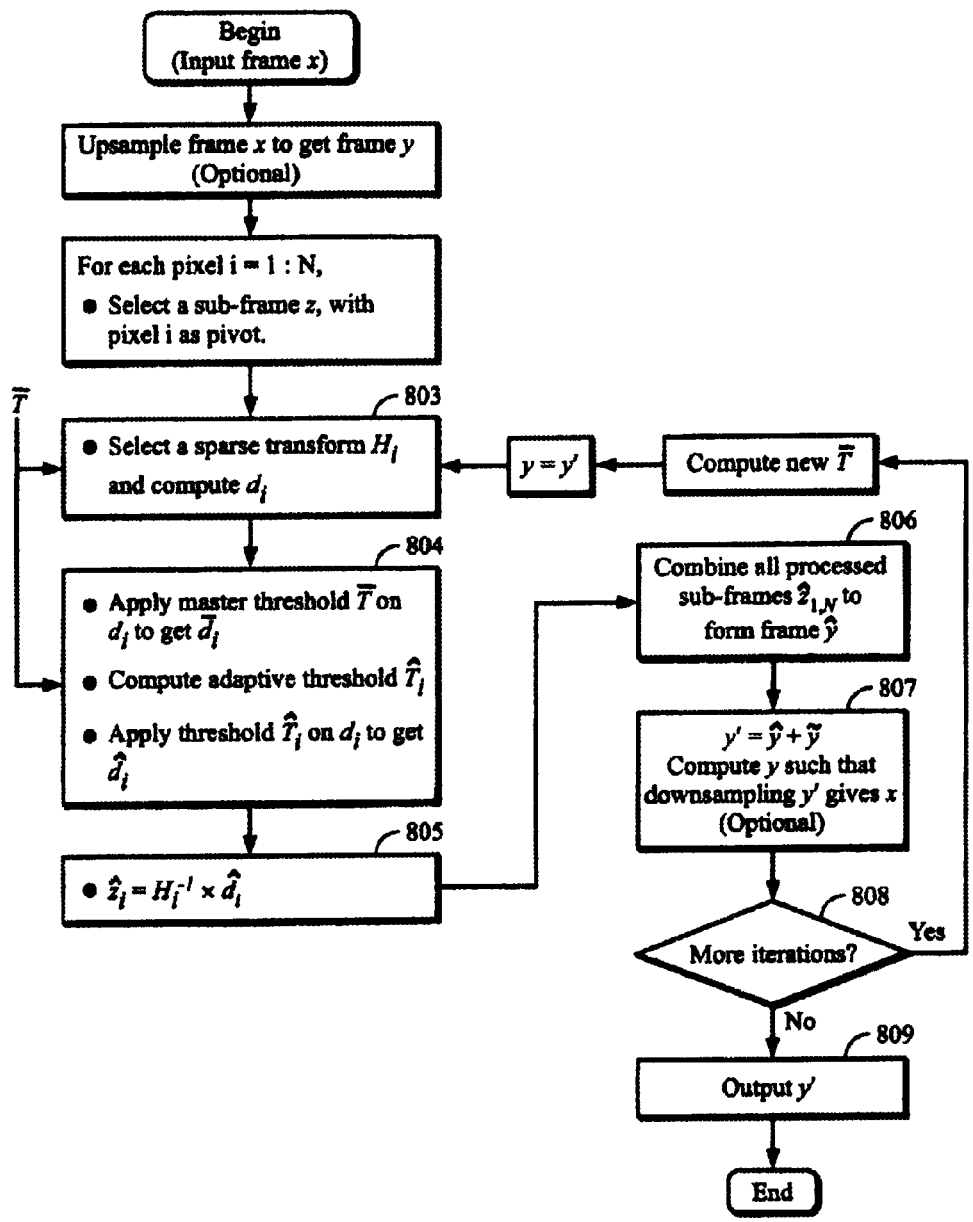
FIG. 8 is a flow diagram of one embodiment of a process for enhancing quality and/or increasing resolution.

FIG. 8 is a flow diagram of one embodiment of a process for enhancing quality and/or increasing resolution. The process is performed by processing logic that may comprise hardware (circuitry, dedicated logic, etc.), software (such as is run on a general purpose computer system or a dedicated machine), or a combination of both.

Referring to FIG. 8, x denotes the input image/video frame of low resolution (LR). In one embodiment, all image/video frames are represented as vectors by arranging the pixels in raster scan order. Alternatively, the data can be represented and/or stored as a vector, matrix, or in any other format.

Figure 9:
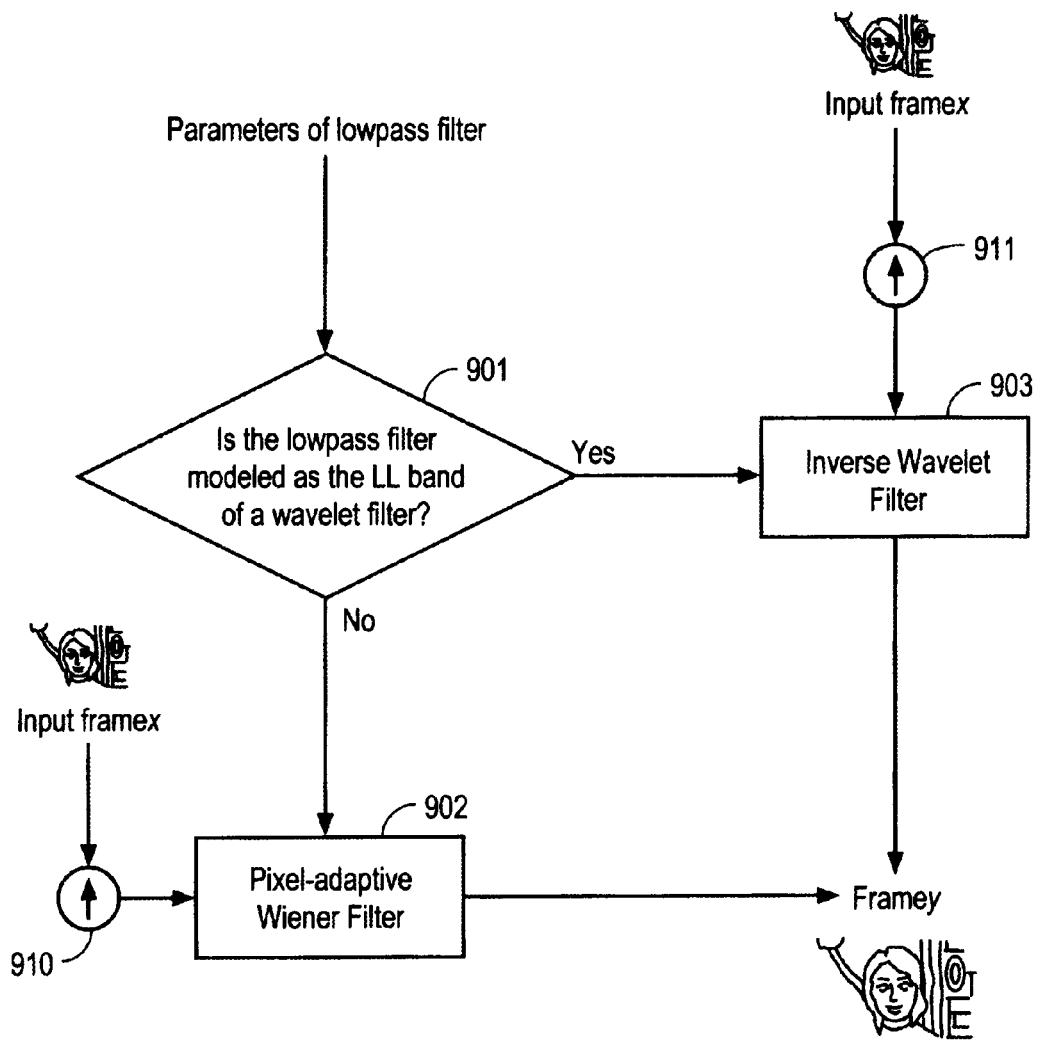
FIG. 9 is a flow diagram of one embodiment of an upsampling process.

Initially, processing logic upsamples input frame x to obtain upsampled frame y (processing block 801). The upsampling may be performed using an upsampling 2-D filter chosen to derive the upsampled version (y) of input frame x. FIG. 9 illustrates one embodiment of the upsampling process and will be described in more detail below. Note that this operation is optional when using the techniques described herein for quality enhancement. When this operation is not performed, frame y is set to be equal to frame x.

After upsampling the input frame x to obtain upsampled frame y, processing logic selects a subframe $z_i$, for each pixel i=1:N, with pixel i as a pivot (processing block 802). N represents the number of pixels in y. In this embodiment, a sub-frame is formed and processed for each pixel in the image. However, in another embodiment, the processing may be performed only on a selected subset of the pixels and not on all the pixels in the image. The subset may be predetermined or signaled as part of the side-information. FIGS. 26A-E illustrate examples of such subsets; other subsets may be used with the teachings described herein.

After selecting the sub-frame $z_i$ with pixel i as a pivot, processing logic selects a transform $H_i$ and computes coefficients $d_i$ by applying the transform $H_i$ on sub-frame $z_i$ (processing block 803). In one embodiment, the transform is a 2-D DCT. In another embodiment, the transform is a 2-D Hadamard transform. The master threshold is an input which can be used to select the transform.

After generating coefficients $d_i$, processing logic applies a master threshold $\overline{T}$ on coefficients $d_i$ to obtain $\overline{d}_i$, computes an adaptive threshold $\hat{T}_i$ and applies the adaptive threshold $\hat{T}_i$ on coefficients $d_i$ to adaptively threshold them to obtain $\hat{d}_i$ (processing block 804). Processing logic then applies an inverse transform $H_i^{-1}$ to thresholded coefficient $\hat{d}_i$ to obtain processed sub-frame $\hat{z}_i$ (processing block 805).

Next, processing logic combines all the processed sub-frames $\hat{z}_{1:N}$ corresponding to all pixels in a weighted fashion to form frame $\hat{y}$ (processing block 806). Then processing logic performs a data consistency step on frame $\hat{y}$ to get frame y' (processing block 807). The data consistency step is defined as:

$$y_1 = \hat{y} + \tilde{y}$$

Processing logic computes $\tilde{y}$ such that the downsampling of y' gives input frame x. Note that this operation is optional when using the techniques described herein for quality enhancement. When this operation is not performed, frame y' is set to be equal to frame ŷ.

Afterwards, processing logic determines whether more iterations are needed (processing block 808). In one embodiment, the number of iterations is 2. The actual number of iterations can be signaled as part of the side-information. If so, the process transitions to processing block 820 where processing logic computes a new master threshold T and sets frame y equal to y' (processing block 811), and thereafter the process transitions to processing block 802. If processing logic determines that no more iterations are necessary, the process transitions to processing block 809 where processing logic outputs frame y' and the process ends. Note that in one embodiment, the linear interpolation operation of processing block 801 and data consistency operation of processing block 806 are optional. If the linear interpolation operation is not performed, (e.g., by disabling the linear interpolation module), the output resolution of the video/image is the same as the input resolution. Thus, under this embodiment, the quality of the video/image is enhanced, but there is no super-resolution.

Figures 10A, 10B, 10C, 10D:
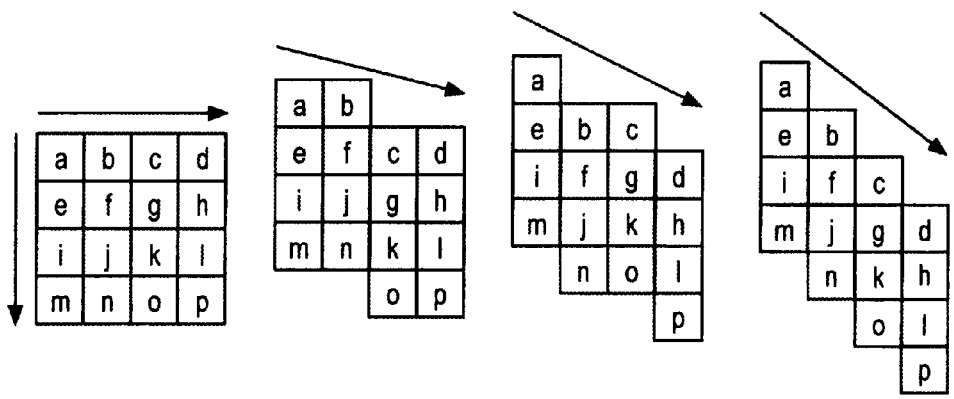
FIGS. 10A-10M illustrate examples of masks that correspond to a library of sub-frame types.
Figures 10E, 10F, 10G:
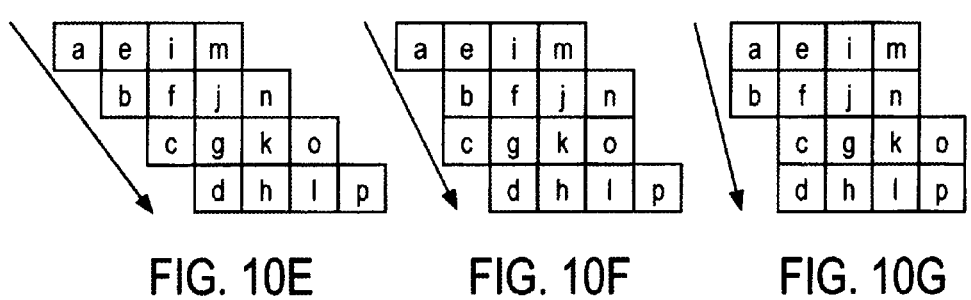
Figures 10H, 10I, 10J:
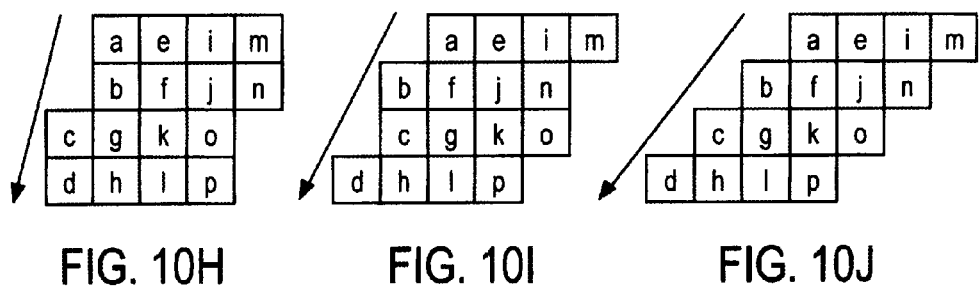
Figure 10:
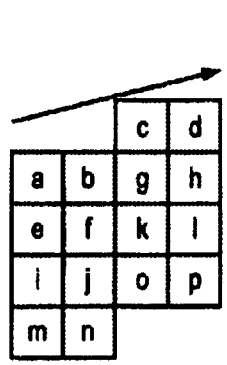
Figure 10:
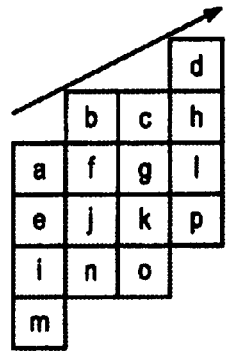
Figure 10:
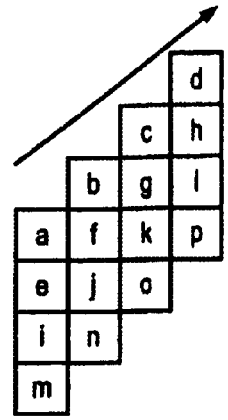
Figure 11:
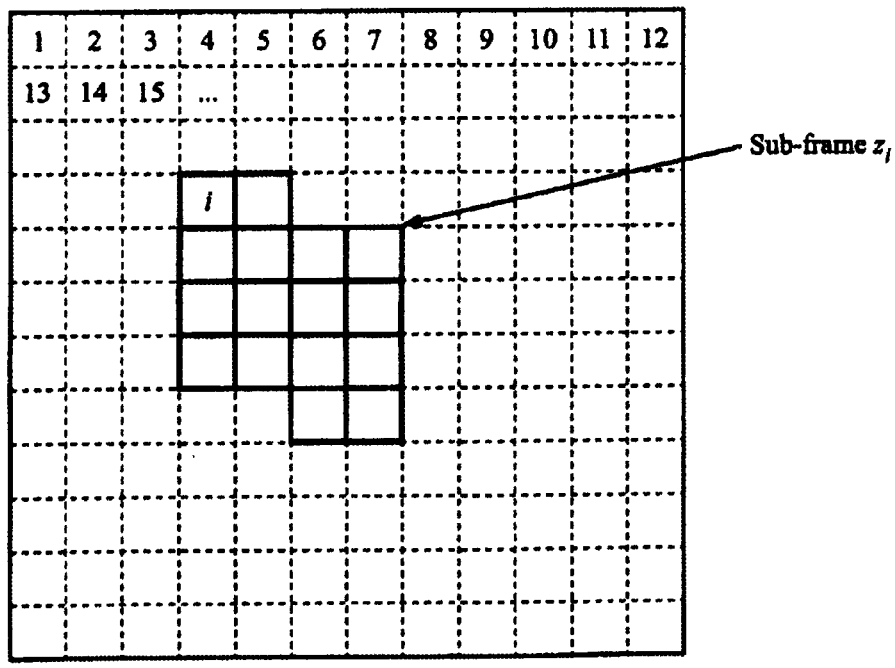
FIG. 11 shows an example sub-frame $z_i$ at pixel i when pixels are numbered in raster-scan order.
Figure 12:
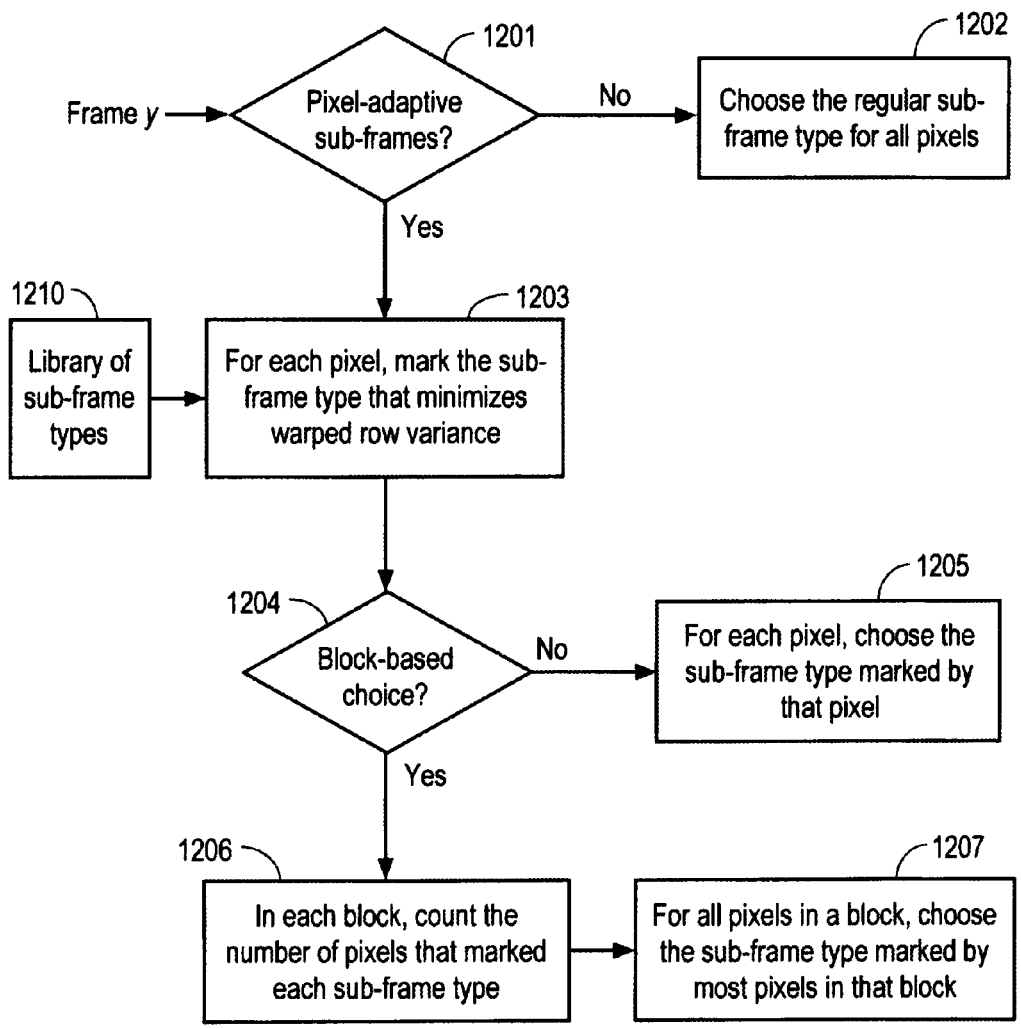
FIG. 12 is a flow diagram of one embodiment of sub-frame selection processing.
Figure 13:
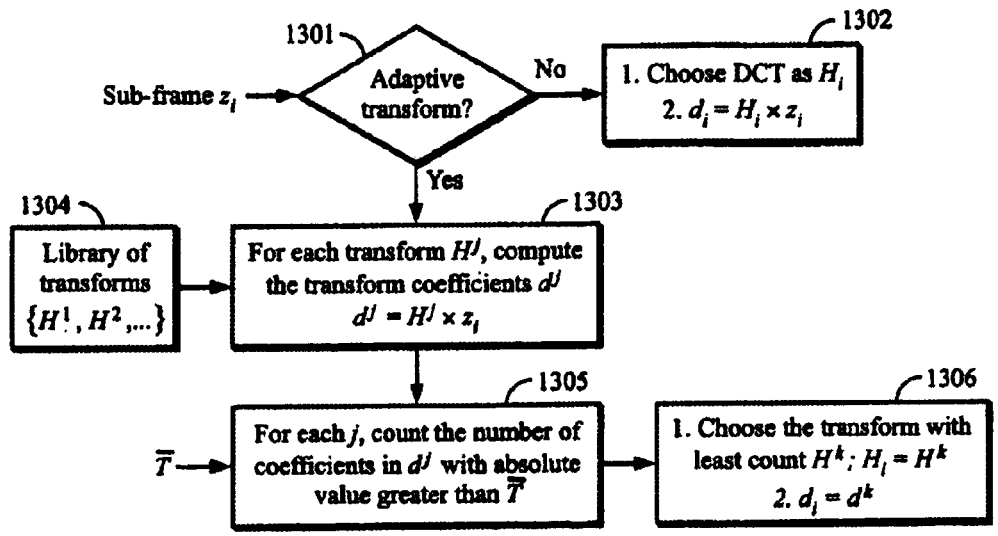
FIG. 13 is a flow diagram of one embodiment of a transform selection process for a sub-frame.
Figure 14:
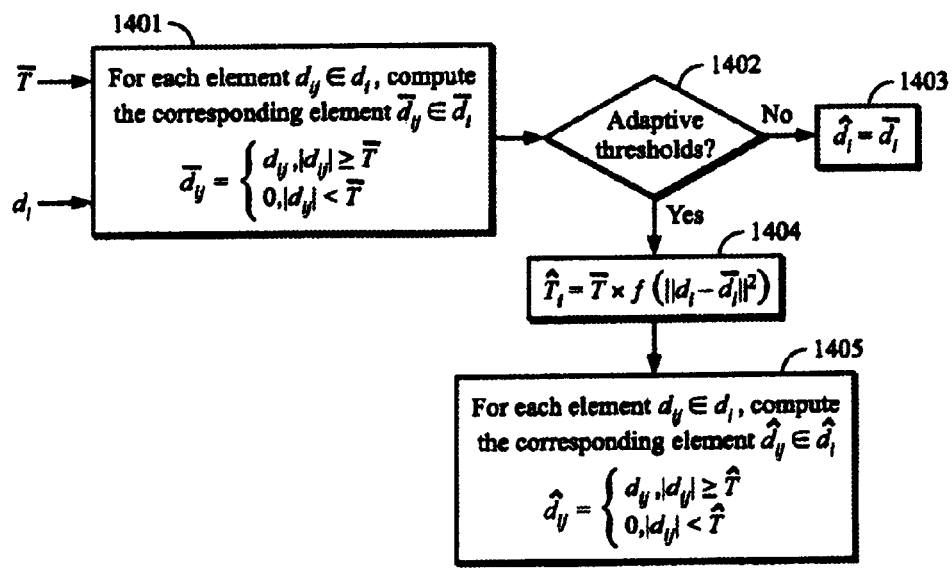
FIG. 14 is a flow diagram of one embodiment of a thresholding process for thresholding transform coefficients.
Figure 15:
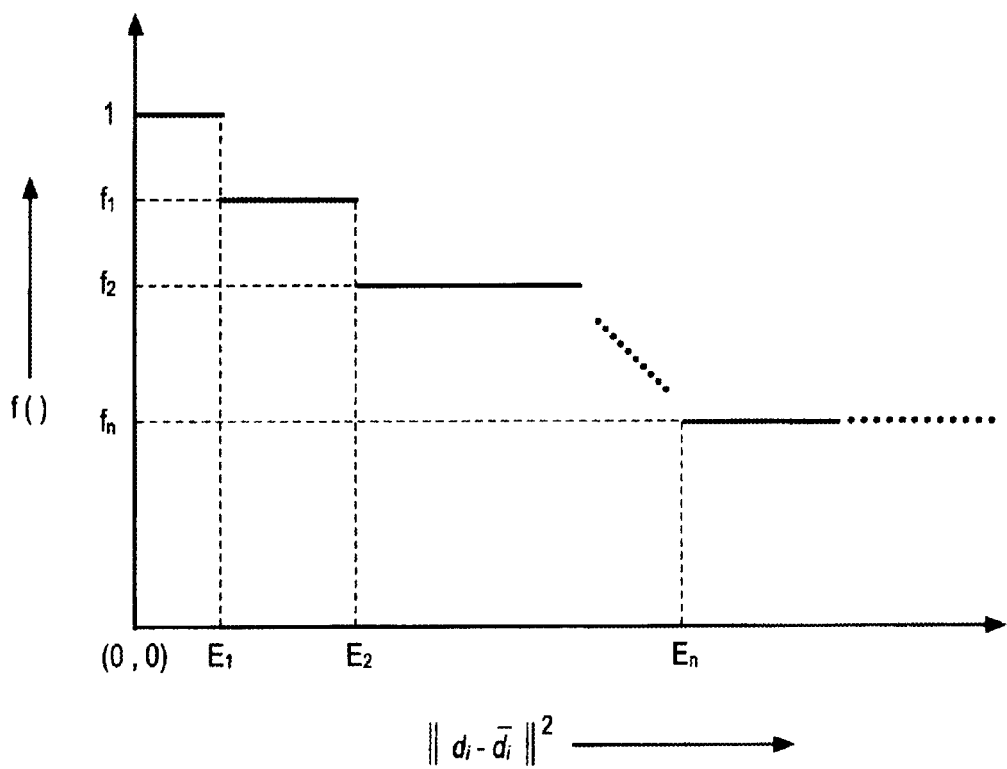
FIG. 15 illustrates a monotonic decreasing stair-case function.
Figure 16:
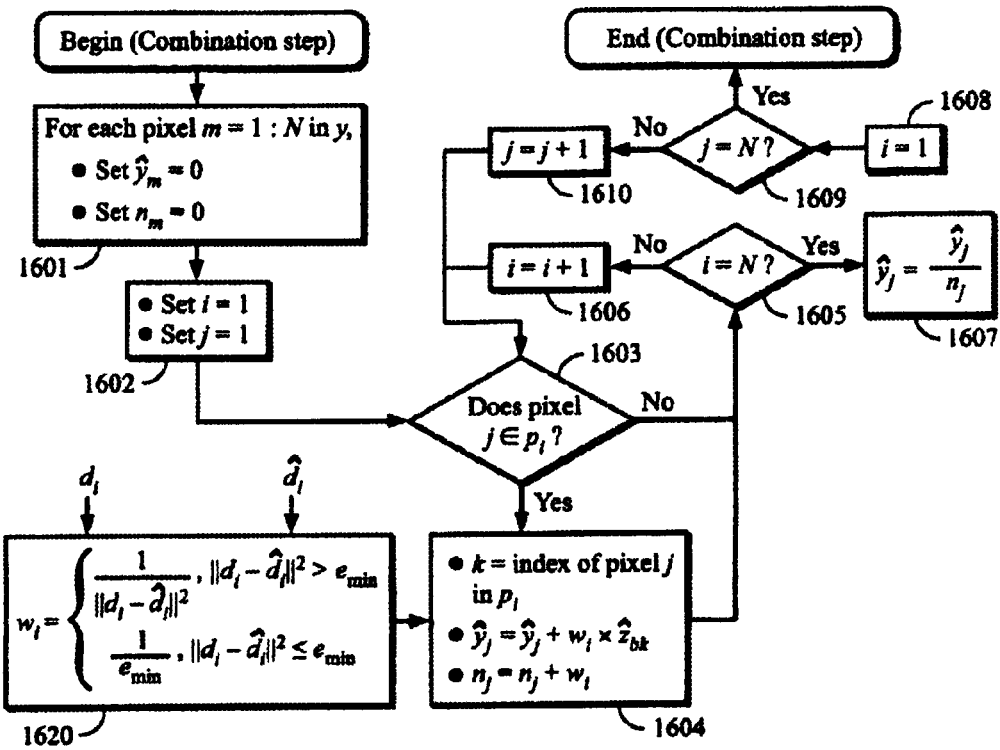
FIG. 16 is a flow diagram of one embodiment of a process for combining sub-frames to form a frame.
Figure 17:
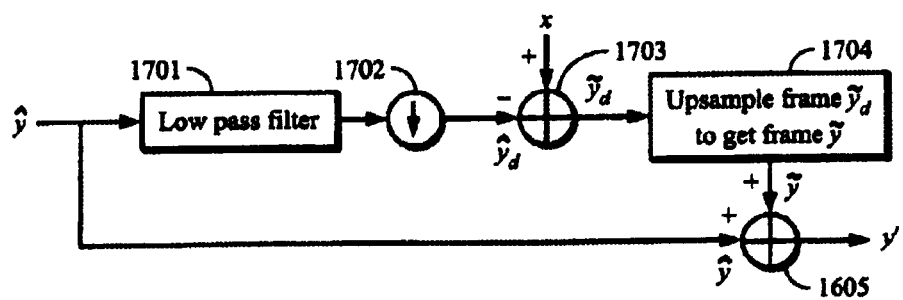
FIG. 17 is a dataflow diagram of one embodiment of a data consistency operation.

FIG. 9 is a flow diagram of one embodiment of an upsampling process. FIGS. 10A-10M illustrate examples of masks that correspond to a library of sub-frame types. FIG. 11 shows an example sub-frame $z_i$ at pixel i when pixels are numbered in raster-scan order. FIG. 12 is a flow diagram of one embodiment of sub-frame selection processing. FIG. 13 is a flow diagram of one embodiment of a transform selection process for a sub-frame. FIG. 14 is a flow diagram of one embodiment of a thresholding process for thresholding transform coefficients. FIG. 15 illustrates a monotonic decreasing stair-case function. FIG. 16 is a flow diagram of one embodiment of a process for combining sub-frames to form a frame. FIG. 17 is a dataflow diagram of one embodiment of a data consistency operation.

For more information on one embodiment of this process and the operations described above, see S. Kanumuri, O. G. Guleryuz and M. R. Civanlar, "Fast super-resolution reconstructions of mobile video using warped transforms and adaptive thresholding," *Proc. SPIE Conf. on Applications of Digital Image Processing XXX*, San Diego, Calif., August 2007, incorporated herein by reference, and described in U.S. patent application Ser. No. 12/140,829, entitled "Image/Video Quality Enhancement and Super Resolution Using Sparse Transformations," filed on Jun. 17, 2008.

Noise and Flicker Reduction

Figure 18:
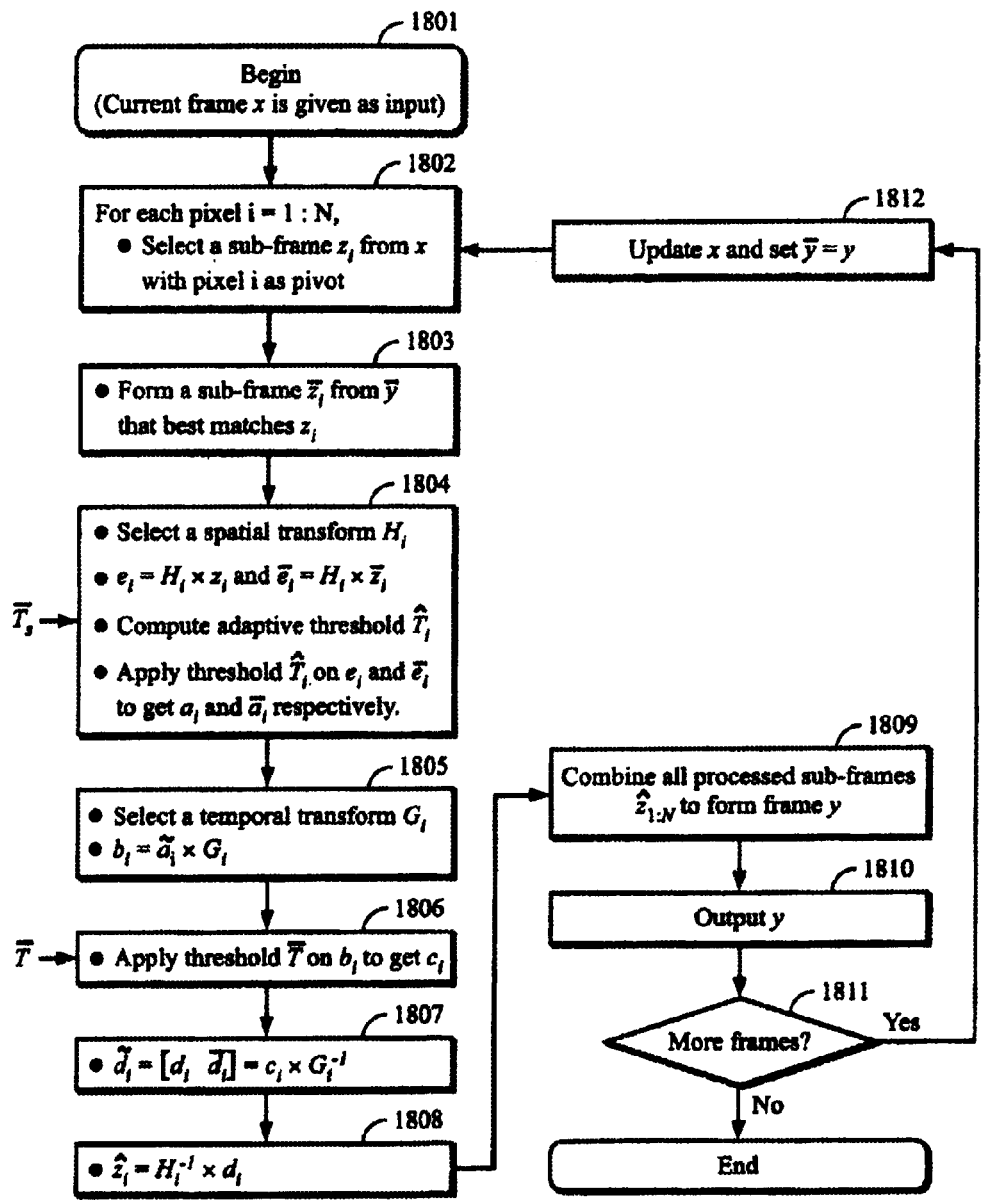
FIG. 18 illustrates a flow diagram of one embodiment of a process for performing image processing on a video sequence.

In one embodiment, the techniques described above, particularly the forward and inverse transforms, are used in a quality enhancement process or a super-resolution process. FIG. 18 illustrates a flow diagram of one embodiment of a process for performing image processing on a video sequence. The process is performed by processing logic that may comprise hardware (circuitry, dedicated logic, etc.), software (such as is run on a general purpose computer system or a dedicated machine), or a combination of both.

In the process described below, x denotes the current frame from the input video that is being processed by the techniques described herein, ȳ denotes the past frame output after using the techniques described herein and T, $T_{S1}$, $T_{S2}$ denote threshold parameters used by the image processing process. Furthermore, a vector denoted by OP, containing other optional parameters, can be supplied. The user or an algorithm can determine the most desired parameters using optimization of subjective/objective quality, using model based techniques, or using other methods. Calibration algorithms can also be used. Such algorithms can also take advantage of partial/complete knowledge of either the video processing pipeline or the input video or both. In one embodiment, all video frames are represented as vectors by arranging the pixels in raster-scan order and N represents the number of pixels in each video frame.

After frame x has been obtained, the sub-frame selection process of processing block 1802 of FIG. 18 begins. A sub-frame type S is defined as an $M^2 \times 1$ integer-valued vector. For purposes herein, M can be any integer greater than zero. $\{S^1, S^2, S^3, \ldots\}$ is a library of sub-frame types. For each pixel i in a set of selected pixels from frame x where pixels are numbered in raster-scan order, a sub-frame type $s_i$ is selected from the library and a vector $p_i$ is formed as $p_i = s_i + i \times \bar{1}$, where $\bar{1}$ is an $M^2 \times 1$ vector with all elements equal to 1. In one embodiment, for pixels that are not selected, $p_i$ is a vector of zeros. The set of selected pixels can be predetermined or signaled within the vector OP. In this embodiment, a sub-frame is formed and processed for each pixel in the image. That is, the set of selected pixels is the entire set of pixels in the frame. However, in another embodiment, the processing may be performed only on a selected subset of the pixels and not on all the pixels in the image. The subset may be predetermined or signaled as part of the side-information. FIGS. 26A-E illustrate examples of such subsets; other subsets may be used with the teachings described herein. An $M^2 \times 1$ vector $z_i$ called a sub-frame is formed with pixel values of frame x at locations corresponding to elements of $p_i$. Pixel i is called the pivot for sub-frame $z_i$. FIG. 11 shows an example sub-frame $z_i$ at pixel i when pixels are numbered in raster-scan order. Referring to FIG. 11, the raster-scan ordering of pixels occurs by numbering pixels starting from "1" in that order. A sub-frame is shown pivoted at pixel i. A sub-frame is organized into M vectors called warped rows. The first warped row has the sub-frame elements 1 to M in that order; the second warped row has the elements (M+1) to 2M; and so on.

In one embodiment, M is equal to 4 and the library of sub-frame types correspond to a set of masks illustrated in FIGS. 10A-M. Referring to FIGS. 10A-M, with this library of sub-frames, the masks correspond to different directions as shown with arrows. The mask in FIG. 10A is referred to herein as a regular mask because it corresponds to the regular horizontal or vertical directions. The other masks are called directional masks since they correspond to non-trivial directions. The differential-position ($\Omega$) of a pixel ('a' to 'p') in a mask is defined as $\Omega = C_C + W \times C_R$, where W is the width of frame y. $C_C$ is the number of columns one needs to move horizontally to the right starting from the column of pixel 'a' to get to the column of the current pixel of interest. $C_R$ is the number of rows one needs to move vertically down starting from the row of pixel 'a' to get to the row of the current pixel of interest. For example, in the case of the mask in FIG. 10H, pixel 'c' has $C_C = -1$ and $C_R = 2$. The sub-frame type corresponding to a mask is the vector containing the differential-positions of pixels in that mask ordered from 'a' to 'p'.

In one embodiment, the choice of the sub-frame type for a pixel is made by choosing the sub-frame type corresponding to the regular mask always. In another embodiment, the choice of the sub-frame type for a pixel is made, for each selected pixel, (1) by evaluating, for each sub-frame type, a 2-D DCT over the sub-frame formed, and (2) by choosing, for a given threshold T, the sub-frame type that minimizes the number of non-zero transform coefficients with magnitude greater than T. In yet another embodiment, the choice of the sub-frame type for a pixel is made by choosing, for each selected pixel, the sub-frame type that minimizes the warped row variance of pixel values averaged over all warped rows. In still another embodiment, the choice of the sub-frame type for a pixel is made by having, for a block of K×L pixels, each pixel vote for a sub-frame type (based on the sub-frame type that minimizes the warped row variance of pixel values averaged over all warped rows) and choosing the sub-frame type with the most votes for all the pixels in the K×L block, where K and L can be any integers greater than 0. In one embodiment, K and L are all set to be 4. In still another embodiment, the choice of the sub-frame type for a pixel is made by forming, for each pixel, a block of K×L pixels and choosing a sub-frame type by using the preceding voting scheme on this block. In each case, the chosen sub-frame type is used for the current pixel. Thus, by using one of these measured statistics for each mask, the selection of a subframe is performed. Note that masks other than those in FIGS. 10A-M may be used.

Figure 19:
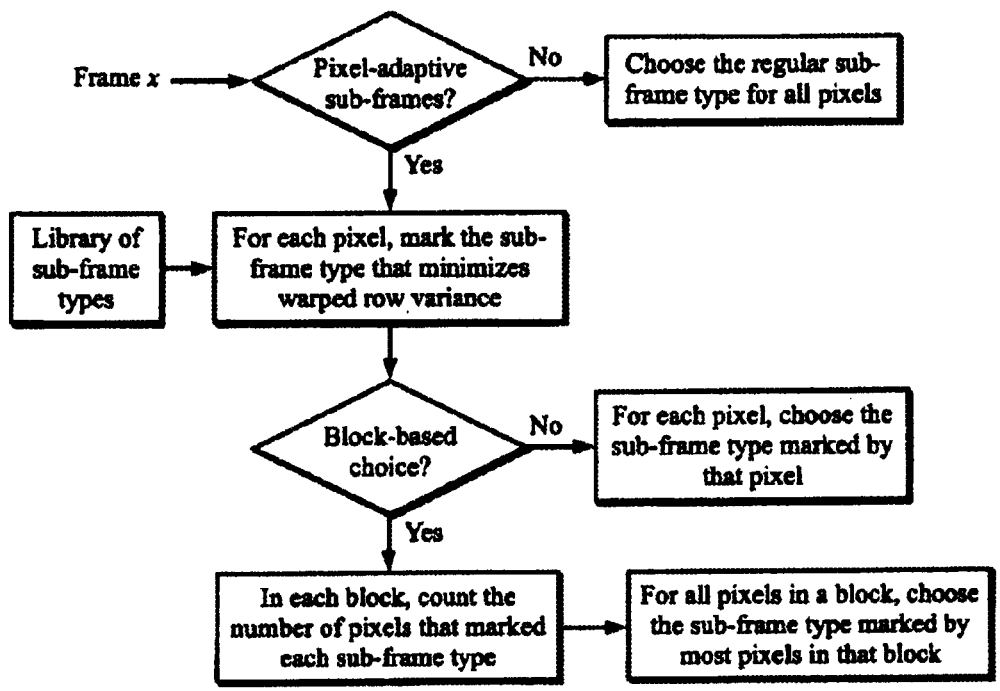
FIG. 19 is a flow diagram of one embodiment of a sub-frame type selection process.
Figure 20:
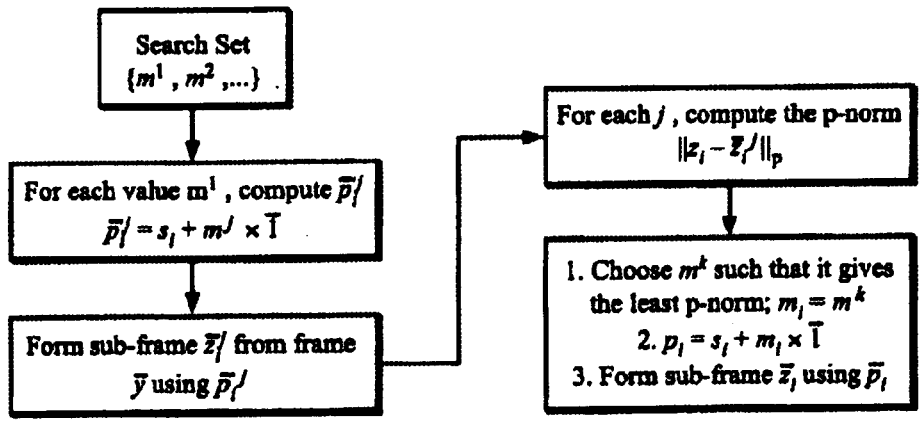
FIG. 20 is a flow diagram of one embodiment of a sub-frame formation process from the past output frame.

FIG. 19 is a flow diagram of one embodiment of a sub-frame type selection process. FIG. 20 is a flow diagram of one embodiment of a sub-frame formation process from the past output frame.

Figure 21:
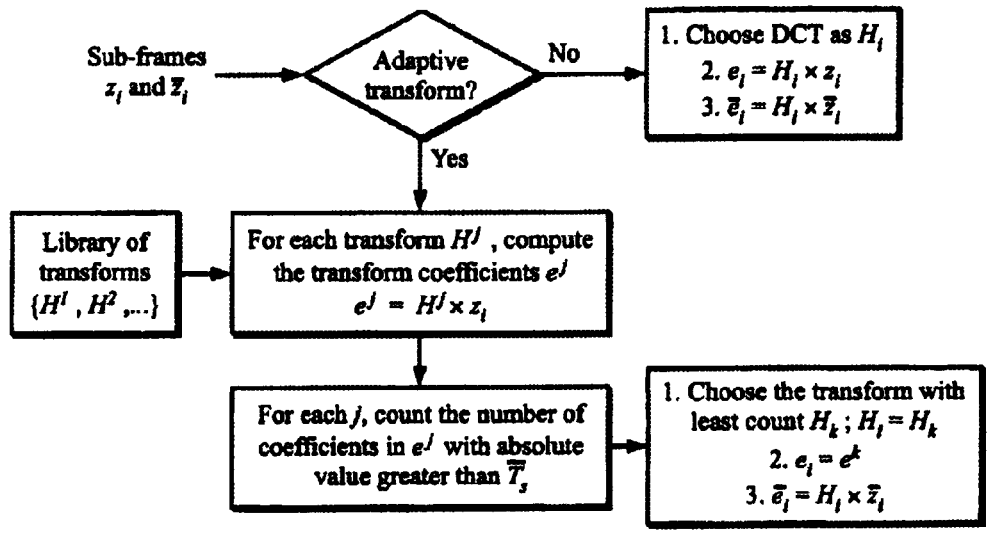
FIG. 21 is a flow diagram of one embodiment of a spatial transform selection process.

As part of processing block 1804 of FIG. 18, processing logic also performs spatial transform selection and application. More specifically, processing logic transforms the sub-frames $z_i$ and $\bar{z}_i$ into $e_i$ and $\bar{e}_i$ respectively using a pixel-adaptive warped spatial transform $H_i$. FIG. 21 is a flow diagram of one embodiment of a spatial transform selection process.

As part of processing block 1804 of FIG. 18, processing logic also performs thresholding. More specifically, processing logic applies an adaptive threshold $T_{i1}$ on selected elements of $e_i$ to get $a_i$. In one embodiment, all the elements of $e_i$ are selected. In another embodiment, all elements except the first element (usually the DC element) are selected. In still another embodiment, none of the elements are selected. The transform coefficients $e_i$ are also thresholded using a master threshold $T_{S1}$ to get $\hat{e}_i$. The thresholding operation can be done in a variety of ways such as, for example, hard thresholding and soft thresholding.

Figure 22:
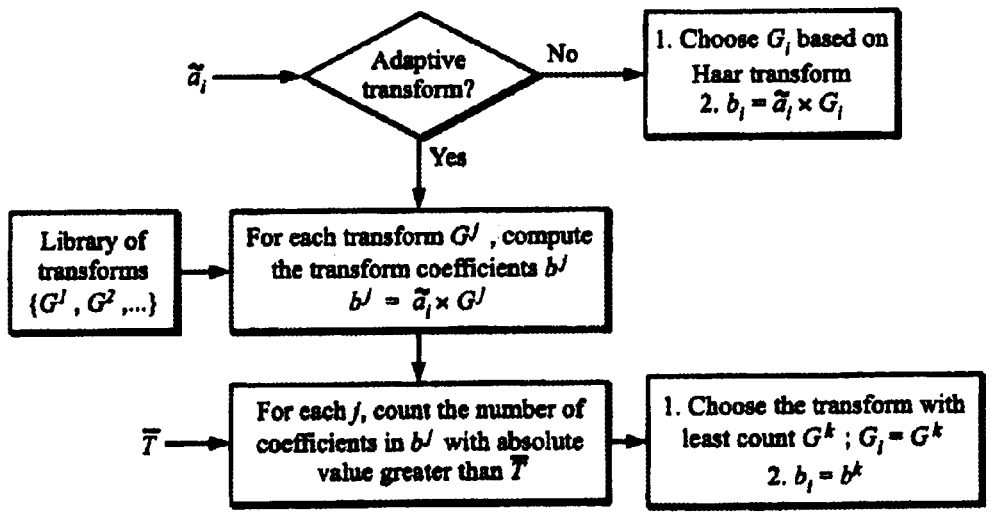
FIG. 22 is a flow diagram of one embodiment of a temporal transform selection process.

Processing logic in processing block 1805 uses the results of the thresholding, namely vectors $a_i$ and $\bar{a}_i$, to form an $M^2 \times 2$ matrix $\tilde{a}_i$; $\tilde{a}_i = [a_i\ h(\bar{a}_{i1})]$. For purposes herein, the function h( ) may be an identity function or a simple linear scaling of all the elements of $\bar{a}_i$ to match brightness changes or a more general function to capture more complex scene characteristics such as fades. Processing logic transforms $\tilde{a}_i$ into $b_i$ using a pixel-adaptive temporal transform $G_i$; $b_i = \tilde{a}_i \times G_i$. The transform $G_i$ can be chosen from a library of transforms. The transform is called pixel-adaptive because sub-frames pivoted at different pixels can use different transforms. In the adaptive case, the chosen transform is the one that has the least number of coefficients in $b_i$ with absolute value greater than a master threshold T. FIG. 22 is a flow diagram of one embodiment of a temporal transform selection process.

Figure 23:
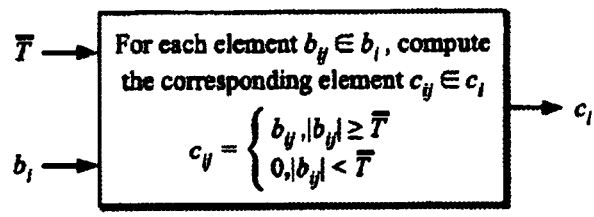
FIG. 23 is a flow diagram of one embodiment of a thresholding process for thresholding transform coefficients.

After generating the transform coefficients $b_i$, the transform coefficients $b_i$ are thresholded using T to get $c_i$ (processing block 1806 of FIG. 18). The thresholding operation can be done in a variety of ways such as hard thresholding and soft thresholding as described above. The choice of thresholding can be signaled within the vector OP. FIG. 23 is a flow diagram of one embodiment of a thresholding process for thresholding transform coefficients.

Figure 24:
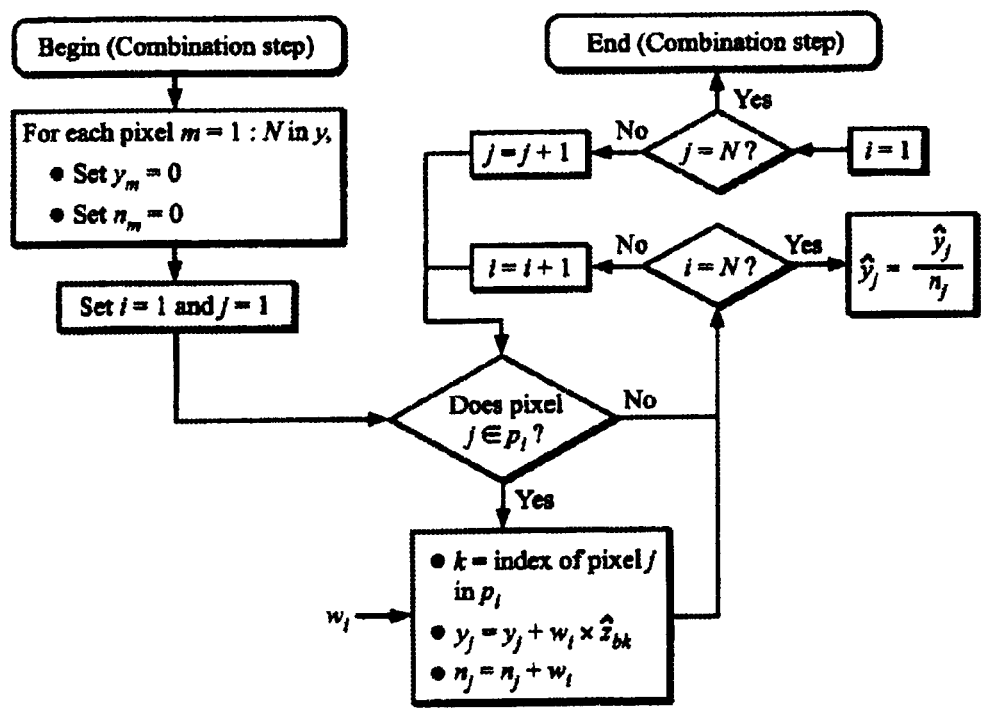
FIG. 24 is a flow diagram of one embodiment of a process for combining sub-frames to create a frame.

After applying the inverse transform to the thresholded coefficients, all of the processed sub-frames are combined in a weighted fashion to form frame y. FIG. 24 is a flow diagram of one embodiment of a process for combining sub-frames to create a frame.

The frame y is the output corresponding to the current input frame x. If there are more frames to process, processing logic updates the current input frame x, copies y into $\bar{y}$ and repeat the process as shown in FIG. 18 (processing block 1812).

Figure 25:
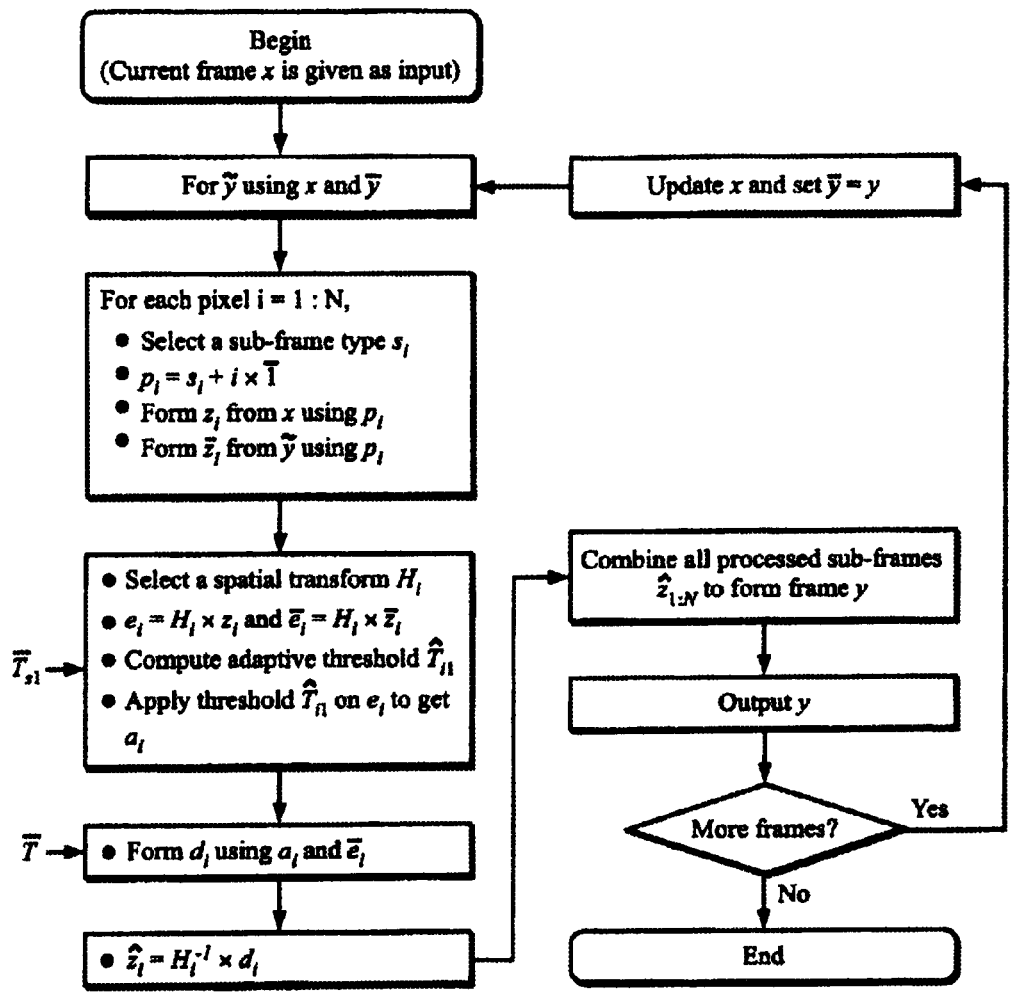
FIG. 25 is a flow diagram of another embodiment of a process for performing image processing on a video sequence.
Figure 26:
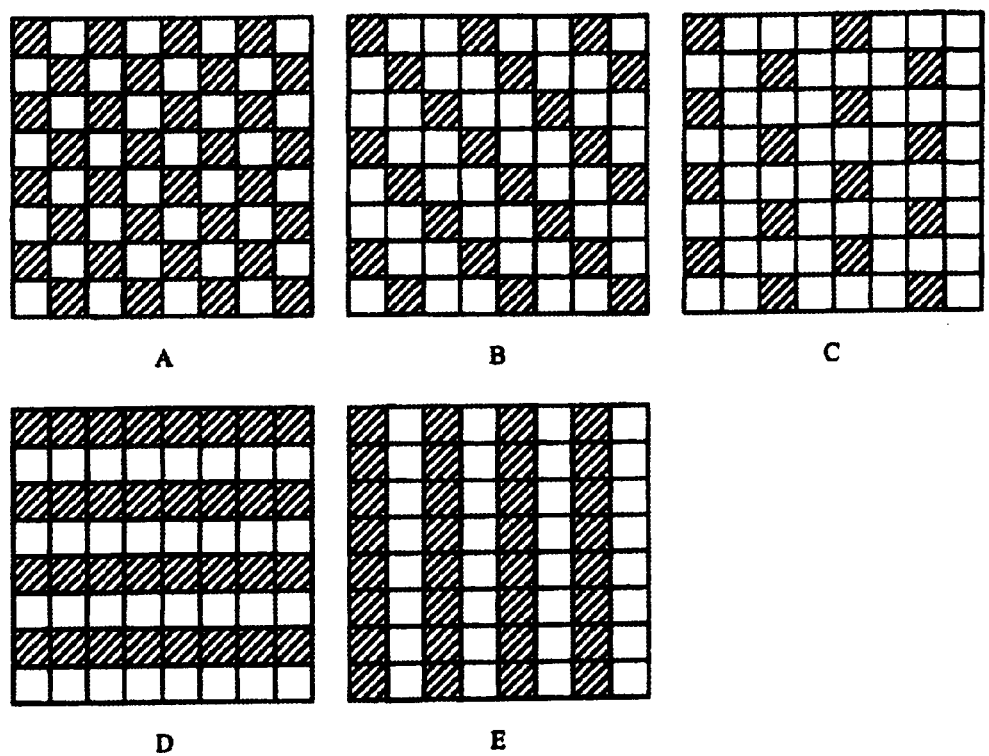
FIGS. 26A-E illustrate example subsets of selected pixels.

FIG. 25 is a flow diagram of another embodiment of a process for performing image processing on a video sequence.

FIGS. 26A-E illustrate example subsets of selected pixels.

For more information on one embodiment of this noise and/or flicker reduction process, see U.S. application Ser. No. 12/233,468 entitled "Noise and/or Flicker Reduction in Video Sequences using Spatial and Temporal Processing," filed Sep. 18, 2008, and described in S. Kanumuri, O. G. Guleryuz, M. R. Civanlar, A. Fujibayashi and C. S. Boon, "Temporal Flicker Reduction and Denoising in Video using Sparse Directional Transforms," *Proc. SPIE Conf. on Applications of Digital Image Processing XXXI*, San Diego, Calif., August 2008, which is incorporated herein by reference.

Other embodiments may use the techniques described herein.

The embodiments of the present invention have been described largely by reference to specific examples illustrated in the figures and described above. However, those of skill in the art will appreciate that alternatives and modifications of the embodiments of this invention will become apparent to those skilled in the art without departing from the scope of this invention. Such variations and implementations are understood to be captured according to the following claims.

The processes described herein may be a machine-readable medium having stored thereon data and instructions to cause a programmable processor to perform operations as described above. In other embodiments, the operations might be performed by specific hardware components that contain hard-wired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories ("ROMs"), random access memories ("RAMs"), erasable, programmable read-only memories ("EPROMs"), electrically-erasable read-only memories ("EEPROMs"), Flash memories, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required process steps. The required structure for a variety of these systems will appear from the description below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that techniques described herein can also be achieved by software and hardware that distribute the functions of embodiments of this invention differently than herein described. Such variations and implementations are understood to be captured according to the following claims.

What is claimed is:

1. A method comprising:
   initializing a first set of buffers;
   performing a forward weight-adaptive over-complete transform and an inverse weight-adaptive over-complete transform operation for a current input frame, the results of which are stored in a second set of buffers;
   rotating and updating the first and second set of buffers; and
   outputting a current output frame based on a respective buffer from the second set of buffers.

2. The method defined in claim 1 further comprising performing at least one data processing operation in the transform domain after performing the forward transform and before the inverse transform.

3. The method of claim 1, wherein initializing the first set of buffer further comprises:
   copying rows of the current input frame into a first buffer; and
   copying rows of a past output frame into a second buffer.

4. The method of claim 2, further comprising:
   performing the forward transform, a data processing operation and the inverse transform simultaneously.

5. The method of claim 1, further comprising:
   storing the current output frame in a third set of buffers.

6. The method of claim 1, further comprising:
   receiving an input frame, the input frame including rows and columns of pixels used for initialization of the first set of buffers;
   obtaining a set of coefficients corresponding to the input frame by applying the forward weight-adaptive over-complete transform to the rows and columns of the input frame; and
   applying a data processing operation to the set of coefficients of the input frame to obtain a processed set of coefficients.

7. The method of claim 6, wherein the forward weight-adaptive over-complete transform comprises a two dimensional forward transform.

8. The method of claim 7, wherein applying the two dimensional forward transform comprises:
   applying a first one dimensional (1-D) transform to a first set of rows of the input frame to obtain a column transform; and
   applying a second 1-D transform to rows of the column transform.

9. The method defined in claim 8 wherein applying the first 1-D transform comprises:
   performing an 1-D forward transform in a column direction on data in a first buffer for all columns.

10. The method of claim 7, wherein the forward weight-adaptive over-complete transform comprises a separable forward transform.

11. The method of claim 7, wherein the forward weight-adaptive over-complete transform comprises the Fast, Hadamard 2-D forward transform.

12. A method comprising:
   receiving an input frame, the input frame including rows and columns of pixels; and
   obtaining a set of coefficients corresponding to the input frame by applying a forward weight-adaptive over-complete transform to the rows and columns of the input frame, wherein the forward weight-adaptive over-complete transform comprises a two dimensional forward transform, and wherein the 2-D weight-adaptive over-complete transform is performed by:
   (1) computing $X_1(1:H-P+1, j,1:P)=OT_1(X(1:H, j))$ for $1 \leq j \leq W$
   (2) computing $Y(i,1:W-P+1,m,1:P)=OT_1(X_1(i,1:W,m))$ for $1 \leq i \leq H-P+1$,
   wherein $X_1(i,j)$ is a buffer, $Y(i,j,m,n)$ denotes the (m,n)th coefficient in a 2-D transform of a P×P block in X with the top-left pixel represented as (i,j), H and W represent height and width of a frame, P denotes a size of the transform, and OT1( ) represents a 1-D weight-adaptive over-complete transform operation.

13. The method of claim 12 wherein at least one of the 1-D weight-adaptive over-complete transform comprises the Fast, Hadamard 1-D transform.

14. A method comprising:
receiving an input frame, the input frame including rows and columns of pixels; and
obtaining a set of coefficients corresponding to the input frame by applying a forward weight-adaptive over-complete transform to the rows and columns of the input frame, wherein the forward weight-adaptive over-complete transform comprises a two dimensional forward transform, and wherein applying the two dimensional forward transform comprises:
applying a first one dimensional (1-D) transform to a first set of rows of the input frame to obtain a column transform, wherein the column transform is stored in a buffer having an amount of rows equal to the first set of rows, the first set of rows having a size less than a total amount of rows of the input frame; and
applying a second 1-D transform to rows of the column transform.

15. The method of claim 14, wherein the second 1-D transform is performed for each row of the column transform based on a block size equal to the amount of rows of the buffer.

16. The method of claim 6, wherein the data processing operation includes one from a set including a denoising operation, image enhancement operation, and flicker reduction operation.

17. A method comprising:
receiving an input frame, the input frame including rows and columns of pixels; and
obtaining a set of coefficients corresponding to the input frame by applying a forward weight-adaptive over-complete transform to the rows and columns of the input frame, wherein the weight-adaptive over-complete transform is performed by:
calculating a forward transform in a column direction on data in a first buffer containing P rows of the current input frame and second buffer having P rows of a past frame and storing the results in a third and fourth buffer, respectively;
calculating the forward transform in the row direction on data in the third and fourth buffers and storing results in fifth and sixth buffers;
performing an image processing operation to coefficients in the fifth buffer based on coefficients in the fifth and sixth buffers and storing results in the seventh buffer;
calculating an inverse transform in a row direction of coefficients in the seventh buffer based on a weight-multiplication of the inverse transform and storing results in a eighth buffer;
updating data in a tenth buffer by adding a weight to data stored at one or more locations;
calculating an inverse transform in a column direction for data in the eighth buffer and storing results in a ninth buffer; and
updating an output frame buffer based on results of a division operation performed using data in the ninth buffer and the tenth buffer.

18. The method of claim 17 further comprising rotating the P rows of buffer containing the P rows of the current input frame, a buffer containing the P rows of the past input frame, the ninth data buffer and the tenth data buffer.

19. The method of claim 17 wherein the third, fourth and the eighth buffers are not initialized to zero when performing the weight-adaptive over-complete transform again.

20. A method comprising:
receiving an input set of transform coefficients; and
applying an inverse weight-adaptive over-complete transform to the input set of transform coefficients to obtain an output frame, wherein applying the inverse weight adaptive over-compete transform comprises:
initializing first, second and third buffers;
performing a 1-D inverse transform and weight multiplication on transform coefficients of a block of pixels with top-left pixel at a particular row and column;
updating the third buffer by adding the results of the 1-D inverse transform and weight multiplication to current contents of the third buffer;
updating the second buffer by adding a weight to locations in the second buffer;
repeating the operations of performing and updating until the transformed coefficients from every block of pixels, whose top-left pixel is at any possible column of a particular row, have been processed;
performing a 1-D inverse transform in a column direction on data in the third buffer;
updating the first buffer by adding the results of the 1-D inverse transform in column transform to current contents of the first buffer;
repeating the operations of initializing the third buffer, performing 1-D inverse transforms and updating the first, second and third buffers until the transformed coefficients from every block of pixels, whose top-left pixel is at any possible row and any possible column, have been processed; and
performing a division operation by dividing data in the first buffer with data from the second buffer.

21. The method of claim 20 wherein the weight-multiplication is performed implicitly by the inverse transform operation with the weight being selected from a discrete set of values and a weight adaptive inverse transform matrix.

22. The method of claim 20 wherein the division operation is approximated by the use of multiplication, addition, and shifts.

23. The method of claim 20, wherein applying the inverse transform comprises performing a two-dimensional inverse in two operations, each of the two operations involving a one-dimensional inverse transform.

24. The method of claim 20, wherein performing the one dimensional inverse transform includes performing a weight multiplication on at least one weight-adaptive inverse transform.

25. The method of claim 24, wherein performing the weight multiplication based on the weight-adaptive inverse transform includes selecting a weight stored in matrices of weights.

26. The method of claim 20, wherein the input set of transform coefficients correspond to processed transform coefficients.

27. The method of claim 26, wherein the processed transform coefficients correspond to an operation from a set including a denoising operation, an image enhancement operation, and a flicker reduction operation.

28. A system comprising:
a processor to perform a forward weight-adaptive over-complete transform, at least one data processing operation, and an inverse weight-adaptive over-complete transform operations for a current input frame;
a first set of buffers coupled to the processor, the first set of buffers to be initialized by the processor; and a second set of buffers coupled to the processor, the second set of buffers to store results of the forward and inverse transform operations of the current input frame; and a third set of buffers coupled to the processor, the third set of buffers to store a current output frame.

29. The system of claim 28, wherein the processor is a SIMD processor.

30. The system of claim 28, wherein the processor is to perform a forward transform operation for a past output frame.

31. A non-transitory machine-readable medium containing instructions stored therein, which when executed by a processor, cause the processor to perform operations comprising:

initializing a first set of buffers;

calculating a forward and inverse transform operation for a current input frame to be stored in a second set of buffers;

rotating and updating the first and second set of buffers; and outputting a current output frame based on a respective buffer from the second set of buffers.

32. A non-transitory machine-readable medium containing instructions stored therein, which when executed by a processor, cause the processor to perform operations comprising:

receiving an input set of transform coefficients; and applying an inverse weight-adaptive over-complete transform to the input set of transform coefficients to obtain an output frame, wherein applying the inverse weight adaptive over-compete transform comprises:

initializing first, second and third buffers;

performing a 1-D inverse transform and weight multiplication on transform coefficients of a block of pixels with top-left pixel at a particular row and column;

updating the third buffer by adding the results of the 1-D inverse transform and weight multiplication to current contents of the third buffer;

updating the second buffer by adding a weight to locations in the second buffer;

repeating the operations of performing and updating until the transformed coefficients from every block of pixels, whose top-left pixel is at any possible column of a particular row, have been processed;

performing a 1-D inverse transform in a column direction on data in the third buffer;

updating the first buffer by adding the results of the 1-D inverse transform in column transform to current contents of the first buffer;

repeating the operations of initializing the third buffer, performing 1-D inverse transforms and updating the first, second and third buffers until the transformed coefficients from every block of pixels, whose top-left pixel is at any possible row and any possible column, have been processed: and performing a division operation by dividing data in the first buffer with data from the second buffer.

33. The non-transitory machine-readable medium of claim 31, further comprising comprising:

receiving an input frame, the input frame including rows and columns of pixels used for initialization of the first set of buffers;

obtaining a set of coefficients corresponding to the input frame by applying the forward weight-adaptive over-complete transform to the rows and columns of the input frame; and applying a data processing operation to the set of coefficients of the input frame to obtain a processed set of coefficients.

* * * * *